United States Patent
Greiner

(10) Patent No.: US 11,295,632 B2
(45) Date of Patent: Apr. 5, 2022

(54) TACTILE DISPLAY HAVING A MAGNETICALLY BISTABLE AXIALLY SYMMETRICAL LINEAR ACTUATOR HAVING A POLE CONTOUR AND SWITCHING MATRIX, AND OPTICAL-TACTILE SEEING AID HAVING SAME

(71) Applicant: Luitpold Greiner, Bamberg (DE)

(72) Inventor: Luitpold Greiner, Bamberg (DE)

( * ) Notice: Subject to any disclaimer, the term of this patent is extended or adjusted under 35 U.S.C. 154(b) by 87 days.

(21) Appl. No.: 16/609,137

(22) PCT Filed: Apr. 27, 2018

(86) PCT No.: PCT/EP2018/025133
§ 371 (c)(1),
(2) Date: Jan. 23, 2020

(87) PCT Pub. No.: WO2018/197052
PCT Pub. Date: Nov. 1, 2018

(65) Prior Publication Data
US 2020/0211418 A1    Jul. 2, 2020

(30) Foreign Application Priority Data

Apr. 29, 2017 (DE) ..................... 10 2017 004 105.9

(51) Int. Cl.
*G09B 21/00* (2006.01)
*G09F 9/37* (2006.01)

(52) U.S. Cl.
CPC ......... *G09B 21/004* (2013.01); *G09B 21/001* (2013.01); *G09B 21/003* (2013.01); *G09F 9/375* (2013.01)

(58) Field of Classification Search
CPC ........... G06F 3/016; G06F 2203/04809; G06F 3/045; G09B 21/004; F03G 7/065;
(Continued)

(56) References Cited

U.S. PATENT DOCUMENTS 5,546,154 A    8/1996  Raney et al.
5,717,423 A *  2/1998  Parker ................. G06F 3/016
345/108

(Continued)

FOREIGN PATENT DOCUMENTS

AT          6515 U1     11/2003

OTHER PUBLICATIONS

International Search Report dated Jul. 31, 2018 in PCT/EP2018/025133.

*Primary Examiner* — Dionne Pendleton
(74) *Attorney, Agent, or Firm* — Rankin, Hill & Clark LLP

(57) ABSTRACT

The invention lies in the field of tactile displays and optical-tactile seeing aids. In order, proceeding from the known tactile displays having linear magnetic actuators, to provide such an electromagnetic actuator for tactile applications, in particular for tactile pins in Braille script displays and graphical surface displays, by means of which electromagnetic actuator an inexpensive bistable electromagnetic linear drive unit of simple mechanical design can be realized, the bar of the actuator consists of a material having very high coercivity, i.e. the polarity thereof cannot be changed, the bar being axially enclosed by a hard magnetic sleeve having at most the same length and having considerably lower coercivity, i.e. the polarity thereof can be changed, and the bar being freely movable in the axial direction and the actuation distance of the bar being defined by the excess length of the bar in comparison with the length of the hard magnetic sleeve, such that an auxiliary pole is formed at one end of the bar and a planar main pole is formed at the opposite end.

13 Claims, 15 Drawing Sheets

(58) Field of Classification Search
CPC ......... F16F 15/03; F16F 15/06; F16K 31/025; F16K 31/0675; F16K 31/0679; G02B 26/085; G08B 13/242; G08B 13/2434; H01F 2007/086; H01F 7/081; H01F 7/16; H01L 41/12
See application file for complete search history.

(56) References Cited

U.S. PATENT DOCUMENTS

2005/0098044 A1\* 5/2005 Spedden .............. G09B 21/004
  99/325
2020/0252009 A1\* 8/2020 Iino ........................ G04G 21/08

\* cited by examiner

TACTILE DISPLAY HAVING A MAGNETICALLY BISTABLE AXIALLY SYMMETRICAL LINEAR ACTUATOR HAVING A POLE CONTOUR AND SWITCHING MATRIX, AND OPTICAL-TACTILE SEEING AID HAVING SAME

BACKGROUND OF INVENTION

Field of Invention

The invention relates to a magnetically bistable axially symmetrical linear actuator. The invention further relates to devices with the same for tactile display applications, and a switching matrix for controlling coils connected in rows and columns in such a device. Finally, the invention relates to an intuitively usable optically tactile visual aid for substitution of human sight.

Brief Description of Related Art

Tactile displays (braille lines) for outputting the data from computers (pcs) for visually impaired people have long been known. With the introduction of graphical user interfaces (e.g. "windows" operating system) pcs and with the growing distribution of screen-oriented operating systems and graphical user software, on the part of the visually impaired the call for novel graphic displays on a tactile basis. Here, for example, a matrix of 200×400 tactile pins is provided on a scanning surface comparable to DIN a4. It is thus necessary for the actuators required for the pin drive to be lined up in an area-wise manner. Particularly with regard to the increasing number of mobile IT devices (notebooks, laptops, smart phones or smart watches) it is also of particular attention to the lowest possible structural height of the display unit, while at the same time providing minimal energy requirements. In particular, there is the need to provide large-area tactile display devices with a large number of individual pins (e.g. 200×400). Especially for pure graphics output, pin spacings of a maximum of 2.0 mm are additionally desired in comparison with the braille cells for the text symbol representation (8 pins, distance=2.5 mm per symbol, additional lateral space between the individual symbols) represents this a significantly higher requirement.

On the basis of the complex boundary conditions in the use of tactile braille lines, piezo-drives for the pins have been put through on the market. The very expensive ceramic actuators, which as a rule operate as bending elements, require additional mechanical force deflections in order to realize a pin movement that runs perpendicular to the scanning surface at all. In conjunction with the high voltage required for the actuator control, an enormous high price level is obtained up to now especially in terms of surface displays. Recent estimations for the price of a tactile surface display (7600 pins) come into the order of magnitude of the season of a very good server.

The mechanical, electrical and economic disadvantages of the established piezo-modules also lead to the fact that, up to now, there is no "barrier-free" in the entire self-service area. There may be no chance of automatic travel map machines with graphical route representation, automatic drinks machines or money/bank machines: the blind has no chance, these devices can be used discretely because, as a rule, no tactile output medium suitable for him is installed.

In conjunction with the required minimum forces (for example: 0.3N) for a reliable scanning operation by the feeling finger, small pin spacings are a fundamental problem, in the case of all axial actuator types in the vicinity of the tactile pin, a sufficient amount of functional material—in this case, for example, in the case of the magnetic actuator, in particular, a coil having a high number of wire windings—must be attached. The simple alignment of all axial actuators of the tactile display in a plane (parallel to the plane of the touch pins) is therefore not possible for spatial reasons.

Of course, the problem of close screening also applies to the usually electrical actuation of the actuators. Particularly in the case of piezo applications, this is particularly critical, since high-voltage electrical modules are used. Finally, in the case of all actuator types, a considerable area for accommodating the normally integrated circuits (IC's) is to be provided. This is usually achieved by lateral attachment of the ICs next to the actuator surface, that is to say the display overall makes the display less compact.

Due to the current market situation in tactile displays, the following observation can be carried out with the center of gravity on piezo-ceramic actuators. This technology currently still represents the state of the art in this field, such as, for example, a pre-study to "hyperbraille" project (report of federal and technology, 10115 Berlin, April 2010, www.bmwi.de).

For large-area displays, the actuators must be lined up very close to one another. In the case of piezo solutions, this results in a considerable overall height by, for example, complicated stacking techniques of a plurality of circuit boards, which leads to this, in particular for mobile applications, the piezoelectric technology is not least attractive—not least because of safety aspects in connection with the required high voltage (>100V) for controlling the actual bending elements.

In particular in each piezo solution it is disadvantageous that at least one stable pin position ("top" or "bottom") can only be implemented by permanent electrical control. In the energy-saving "off-state" of the entire display, no valid display of the data is thus ensured.

The plurality of tactile displays uses piezo actuators connected to all their resulting disadvantages (high price, large structural heights, permanent high voltage, Mechanical add-on devices for force transmission), as described, for example, in DE 103 49 100 a1 for a 10-pin surface module. The problem of piezo actuators when used in flat displays, in particular the mechanical and electrical requirements, is solved in DE 103 49 100 a1 by complex stacking methods of a plurality of individual boards. When used in connection with tactile pins, it is required for the actuator, in such a way that the respective "top" and "bottom" position are clearly defined and a sufficient holding force (e.g. 400 mN) is provided. DE 103 49 100 A1 likewise offers a piezo-surface solution, but the use of additional mechanical elements (toggle lever transmission) again the basic difficulty of ensuring a clear, clearly tactile "top" or "bottom" state of the pin. Only the device of the mechanical force transmission takes up geometrically considerable space, the physical accommodation of the control IC's and plug-in connectors to a bus system causes the overall height to be increased again in the vertical direction.

DE 10 201 0 005 933 a1 likewise shows this problem: here, in addition to the use of a wedge gear in the resetting of the pins, it is even familiar to the force of gravity, which is subject to problems with regard to the correctness of the data display before the background of mobile applications.

US 2010/0085168 a1 provides a planar arrangement of linear actuators, i.e. a planar arrangement of piezo-individual elements parallel to the pin plane, however, linear piezo actuators are expressly referred to, it being left completely open how the quite considerable necessary tactile stroke of approximately 0.7 mm can be technically realized. The difficulty of obtaining small pin spacings (less than 2.5 mm) is already clear from the representation (1) there. In US 2010/0085168 a1, no reference will be made to how the required minimum forces can be achieved in connection with the dimensioning of the piezoelectric components.

In DE 10 200 7 022 056 A1, an attempt is made under realistic conditions (with regard to forces and spatial dimensions of the piezo actuators) to enable a flat display. a plurality of circuit boards is required in which, however, only one edge region is used in order to accommodate the piezo actuators. The assembly of the overall display is complicated and results in a construction height of the device which is not acceptable, for example, for mobile applications.

A surface display provided with magnetic actuators, in particular a display projection for mobile solutions, is disclosed in DE 198 27 666 A1, where, in addition to piezo actuators, electromagnetic actuators are also mentioned, however, here the control of the pins takes place only line by line, by means of an additional control carriage which is to be displaced mechanically. The illustrated magnetic version also includes a plurality of additional mechanical catch and lever devices. Accordingly, the problem of the high space requirement of the drive coils is solved here, by moving the magnetic actuators from the mechanically moving control carriage out of the pins only line-by-line to the "top" or "bottom" position. a rapid electrical single addressing of the pins—as is absolutely necessary for graphic PC applications—is in no way given here.

A basically similar procedure is described in DE 10 201 4 011 326 A1. Also in this case, the positions of a tactile surface display cannot be individually addressed and there is a fullness of mechanical guide holding and supporting elements for realizing a stable top/bottom position of the tactile pins. In the description, the hitherto unsolved problem of the use of electromagnets in the tactile environment (typical grid approx. 2.5 mm) is highlighted. For a compact—perhaps even mobile—tactile surface display device, the presented solution is likewise not suitable.

U.S. Pat. No. 4,259,653 describes a bistable linear actuator with permanent magnets. However, the "top" position, which is important for tactile applications, is here the least stable (lowest force of the system) the system immediately falls into the "down position" and, above all, a reliable representation of the data in the "off" state of the display is no longer possible.

Also a magnetically actuated information display device described in U.S. Pat. No. 4,831,372 operates in principle electromagnetically bistable, here, however, no forces whatsoever are transmitted to the outside; only in the interior of a closed optical display cell an intermediate wall is displaced. Here too, a fullness of additional guide and end stop elements is required. The information display device comprises a rigid permanently magnetized display segment, which is movably mounted in a non-magnetic chamber with a transparent viewing window and contains an opaque fluid whose colour contrasts with the colour of the display device. a core attached to the back of the chamber is able to be selectively magnetized to repel or attract the display segment according to the selected magnetic polarity of the core. The display segment moves in the direction of the transparent window, through which the color of the display segment can be viewed when the opaque fluid is displaced away from the transparent window. The attracting of the display segment by the core causes the display segment to move away from the transparent window, thereby enabling the display segment to move away from the transparent window, that the opaque fluid affects the viewing of the display segment. In this position, the color of the opaque liquid is viewed through the transparent window. The bistability of the magnetically actuated information display device is achieved by the residual magnetism in the core acting on the permanently magnetized display segment. The duration and magnitude of the energy that must be applied is minimized, in order to initiate a change in the display of information, a plurality of display devices can be combined in an array to form a display field with improved resolution of the displayed image.

Magnetic linear actuators are also described in U.S. Pat. Nos. 3,755,766 and 4,072,918. The problem of the stable end position is solved here by additional spring systems. However, these springs prevent the system from rapid response to control signals (opposite direction), weaken the above-holding force and additionally complicate the construction. In order to treat the problem of forces, soft magnetic flux conducting devices are also required, as a result of which the actuator is neither compact nor inexpensive to produce.

In particular for the mobile tactile display in braille symbols, a micro-electromagnet is described in EP 0925570 B1. It is also characteristic here that permanent energy has to be supplied for at least one end position of the coil and also for the return leaf springs and o-rings are used.

In U.S. Pat. No. 5,466,154 A, in the case of a braille plate with movable point pins, the problem of duration energization and attainable tactile forces (here only 50 mN) of previous electromagnetic solutions is shown. In the case of the solution of the braille plate presented there, having a microprocessor and having a multiplicity of solid-state switching chips, wherein for translating the alphanumeric information, each of the actuators is selectively actuated under the control of the microprocessor and a chip controller, either a hard magnetic bar is moved by means of air coils or an air coil with a field-reinforcing iron core, that is to say completely normal "conducting iron", is used without further magnetic specification. In the case of the "above-position", permanent energization is required, so that a maximum force of 50 mN is achieved when current is applied to 10 mA. The method is based on tactile surface displays of 10,000 pins, of which then, on average, 5000 parts would have to be permanently supplied with current, even for this low force of 50 mN to a current demand of 50 A. This explains, inter alia, why the use of piezoelectric technology defines the state of the art.

DE 102 60 668 A1 has a plate-shaped armature but also uses additional springs in order to realize the "top" position.

DE 102 34 863 A1 describes an electromagnetic push-button with tactile feedback. Here for the movement and end position fixing of the hard magnetic inner core an additional spring element is also required in addition to the duration of energization of the coil.

The primary approach of EP 1 681 687 B1 is the highly complex development, production and use of magnetic composite materials for optimizing external field profile as a function of the micro/nano-magnetic structure of these new materials. Despite this considerable inventive expenditure—its cost-related sequences cannot be detected even at all—the embodiment presented shows a bistable linear actuator unit with two hard magnetic materials of different coercivity for the special case of a "braille application"

having the disadvantages known from the prior art. Here (at least) two movable hard magnetic bodies are arranged one behind the other. The "top" and "bottom" positions are not clearly defined herein, which does not play an important role in the explanation focus of the device for spring-technical applications, but is essential for tactile applications. In addition, it is clearly shown that, in order to maintain the "top" position, a permanent current flow through the additionally moved exciter coil is required.

All presented electromagnetic solutions have in common that no details of the geometric configuration of the pole shapes (e.g. contours or side ratios) are made, which are based on the special requirements of tactile surface displays. In addition, solutions are also discussed by "memory metals" (see, for example, Haga, Makishi et al. Al, in sensors and actuators a, Vol. 119, 13. April 2005, p. 316-322). However, the time response of these configurations does not satisfy the claims of rapid addressing.

For tightly located tactile pins in braille-script displays and graphical surface displays, a mechanically-structurally simple and inexpensive bistable electromagnetic linear drive unit should be provided, in which the "top" and "bottom" position is mechanically unambiguously defined. This is intended to take place without additional holding, lever and damping devices and permit a small overall height of the later overall display. In particular the holding force and the holding position of the above-mentioned position, the tactile requirements are to be adjustable correspondingly by simple design measures. Especially with regard to mobile applications, the actuator should be particularly energy-saving and, even in the "off-state" of the overall device, maintain the correct representation of the last computer data. For the large-area representation of graphical contents, the unlimited narrow (=grid spacing is less than or equal to 2.5 mm) flat juxtaposition of the individual actuators must be ensured. Disturbances and couplings between the individual actuators must be minimized.

The trivial boundary condition of such a computer display is, of course, the fast individual addressing possibility (similar to a "random access memory") of the tactile pins. It is furthermore intended to be made possible in this case, to position a multiplicity of pins which are to be moved perpendicularly over a large area at a predetermined narrow grid spacing in such a way, in spite of a lateral dimension of the individual drive unit which significantly exceeds the actual pin grid size, the desired narrow grid spacing of the pins can be realized. The mechanical force transmission and electrical supply of the actuators must be realized with minimal overall height of the display.

With the growing distribution of screen-oriented operating systems and graphical user software, there is the need to provide large-area tactile display devices with a large number of individual pins (e.g. 200×400). Because of the high number of individual pins, the perfect function of the individual tactile pin is therefore a prerequisite for a long use time period in order to guarantee the satisfactory function of the display as a whole. Thus arise—alone from the point of view of the error statistics—significantly increased requirements with respect to the reliability of the function of the single pin.

Lack of robustness and short service intervals are also an essential reason why previous tactile displays have hardly been found in the public space. As far as nowadays, there is virtually no "barrier-free", for example, in the entire self-service area, there may be no chance to use these devices discretely because, as a rule, no reading unit suitable for him is installed.

Completely independent of the type of actuator used for the end user is the easy readability of the display—that is to say as high as possible minimum actuating forces (such as, for example, 0.3N) for a reliable scanning operation by means of the feeling finger—and above all the reliability of the overall device in the foreground. The main source of interference is, however, contamination which originates solely from the nature of the tactile operation during reading or during the input: fat, skin particles, hair and sweat are introduced directly through the human being using the display. Dust, moisture and provided wetting of the display with liquid additionally cause the service to be brought about earlier or later.

A way to reduce external influences is gone by the application of films to the tactile sensing surface, as described in DE 101 27 039 B4. The disadvantage here is that the elevation of the feeler pins is less pronounced with respect to the display plane, that is to say reading of the tactile information is thus more cumbersome and less reliable. For this reason, display covers have not been put through in practice.

The alternative to covering the top side of the display is the sealing of the individual pin in its guide, as described, for example, in DE 103 06 230 B4. This method is fundamentally critical in connection with the generally low actuating forces of the actuators. In addition, it makes the structure of the unit more complicated and to think to a simple deconstruction of the individual pin—in the ideal case by the visually impaired end user himself—, even in the case of the embodiment shown.

In order to be able to eliminate a contamination problem in the pin region, the end user must generally send the entire tactile display for cleaning to the manufacturer. DE 37 06 286 A1 therefore proposes a display with a completely exchangeable reading pin unit which can be separated as a whole by the piezoelectric actuator part. In this way, in the event of a service, the actuator part can remain at the end user, which then, however, is capable of further operating with the display only by means of an extra complete reserve pin unit to be inserted. It is disadvantageous here that even in the event of a malfunction of only a single pin, the entire pin unit has to be removed, because the pins themselves are incorporated in their unit so that they cannot be removed, that is to say they are not easily dismantled by the end user itself, and the purchase of the reserve pin unit naturally causes additional costs. In order to ensure both the force coupling between the actuators and the actual tactile pins, and the replacement of the complete pin unit are provided here on the lower sides of the read pins which interact with the ferromagnetic material on the free ends of the activators. With this special arrangement of the magnetic material, dynamic loading of the actuator/pin system due to the increased overall mass of the hard magnet is critical here. In addition, precisely the property of the mechanical fitting production due to the connection in this arrangement of hard-magnetic and soft-magnetic material does not come to bear, because of the described planar configuration of the magnet at the pin end, additional transverse forces can occur at the pin end, which do not hinder both the pin and the actuator in the free vertical movement. As a result, in the depended claims, it is also pointed out in its entirety for the need for additional stitching for ensuring the fitting function between the module body and the reading pin unit. As a result, it is also clear that considerable expenditure for the mechanical precision (tolerance problem) of the two complex parts will be necessary. The illustrated magnetic coupling with a flat permanent magnet at the pin end does in no way perform the task without additional mechanical devices, in order to adjust the individual pin reliably without impressing transverse forces.

The aim of the invention is to provide a simple and cost-effective possibility for tactile pins, the negative consequences of the current contamination sources for the satisfactory function of the single pin without the tactile quality of the display being impaired by this measure. In the event of a service, each individual pin should be easily removed/cleaned and can be used again without problems, and this is possible as far as possible even by means of an unshipped, visually impaired end user.

The congruent transmissions of the transition with the graphical user interface to the user area of the visually impaired person on the PC, efforts additionally also the interactive, intuitive usability of the tactile display as an input unit, i.e. a bi-directional mode of operation. German Patent Document DE 103 49 100 A1, which has already been described above, must be additionally wired to one another in order to electrically actuate the individual circuit boards. The described actuator arrangement also operates exclusively passively as a display device. In order also to be able to implement inputs for controlling the overall device, further actuating switches are necessary which, in addition to the spatial space requirement, also drive the electrical wiring complexity into the height.

Furthermore, US 2005/0158695 A1 discloses a tactile display device, in which the image information is displayed as height differences between tactile pins which are driven in a cross-shaped manner in a matrix arrangement and in which a guide plate with a friction fit for the tactile pins is arranged below the plane of a pin plate.

Furthermore, a tactile display device is known from JP 2004-7101677-A, in which the actual tactile probe pin is firmly connected at one end to an actuating rod, the diameter of which is smaller than the diameter of the actual probe pin. The control elements which control the projecting or retraction of the feeler pins are controlled by a movable unit, which can move vertically and horizontally at high speed, so that a sharp tactile display with high resolution can be achieved.

A pure input device with haptic feedback of a key pressure via coils and movable magnets describes DE 10 2010 012 247 A1. In a dependent claim, reference is made to a matrix-like interconnection with connection of coils to at least one multiplexer. Merely by the designation "input device" it is clear that the structure in the form described can in no way be used as an output unit (for example as a tactile graphic display).

The same purely passive mode of operation also shows DE 10 2014 104 633 A1, where in each case two coils are coupled in pairs and matrix-wise connected to form a coil field.

An economical matrix interconnection of signals also describes DE 10 2004 055 939 B4. The selection takes place here via electrical blocking elements in the electrical lines in conjunction with further capacitive elements, which is prohibited in the case of a tactile application treated by this application because of the coil current supply via an applied DC voltage from the outset. This matrix interconnection also operates exclusively in one direction when viewed electrically.

A matrix sensor element is also described in DE 10 2010 000 669 A1. The application focused there relates to room detectors laid in the floor for detecting persons. These only in the unidirectional direction operating device, uses as useful information the change in the natural frequency of oscillators, and requires in addition to the coils also additional capacitive components.

For severely visually impaired people, there is a fullness of visual aid devices, which usually offer the help of increasing and increasing contrast. For completely flashed people, this type of device does not, of course, represent any help. The use of acoustic auxiliary devices, for example in the "reading out" of texts, gives the blind but no further graphical or optical information. Conversely, the massively visually impaired, as a rule, has a pronounced tactile sensibility in its fingertips, usually caused by the intensive training with the reading of the braille characters.

Therefore, tactile displays are widely used for the output of the data from computers (PCs) for visually impaired people as so-called "braille lines". In the meantime, large-area tactile graphic displays with a high number (e.g. 250×400) of sensing positions can be technically realized. First examples of such displays are presented in the meantime as prototypes for stationary applications on relevant fairs.

With regard to, as a rule, the high tactile competency of the users of tactile graphic displays or standard braille lines, the call for a universal (=not only text-originated) mobile tactile visual aid for blind noises arises: Encasing the visual domain, this is not directly accessible by the visual impediment, and using its own tactile capabilities and a new auxiliary which is tailored for this purpose. The intuitive usability of the device is crucial for the purpose of passing on the market: it is expected that virtually without additional intensive training, the unconscious sequence of "normal" human facial is considered, as a whole, can be simulated with foveal and peripheral vision on a tactile plane and the visual aid can also be used in a mobile manner.

First trials of attempting to obtain optical structures in the blind perceptible information with significant spatial resolution are described in DT 2330403 A1. In this case, a planar contrast structure is transferred into an analog electrical charge pattern matrix with a specific, design-related lateral resolution by means of a contact method, that is to say without lens-optical imaging. The human skin is proposed as a sensor for this information because of the planar construction of the charge carrier matrix, preferably the front part of the human being as a supporting surface. Apart from the very limited lateral resolution of this method, this "see with the skin" is associated with a considerable, annual training effort. The reliability of the method (for example the problem of electrical charges at high air humidity) is also doubtful. No real image of the 3-dimensional real environment is available because of the lack of imaging lens elements.

A "tactile interaction monitor (TIM)" is presented in DE 42 41 937 A1. This more theoretical device concept, according to the illustration of the applicant, however, more refers to ".philsophilic, speech-based, character-theoretical and cognitive research work . . . " and does not offer any specific indications for practical technical realization by a person skilled in the art. According to prior art (1992) a plurality of small tactile spot grids (with typically max 256 points per matrix) is used. The raster elements (some are in principle only shortened standard braille lines) are permanently assigned to the hand surface or fingers of the blind for the purpose of scanning. Despite the use of a camera/scanner, a continuous tactile representation of an image of the environment that is closed without gaps is thus not possible. An attempt is made to compensate for this disadvantage essentially by a zoom and cut-out function of the device. Exactly here, the greatest disadvantage of the TIM is: the complicated control of zoom and section requires a large number of additional function keys, which have to be operated in a quasi-temporally parallel manner with the actual tactile "visual process". Just the human short-term memory mentioned in the text with a storage time of max 8 seconds is therefore totally overridden in the operation of the TIM. Even the presumably 2 annual additional training given by the applicant for the successful orientation in the real environment with the device changes little at the baseline of the brain physiological facts. It is easy that the TIM cannot be used intuitively with certainty and a parallel tactile substitution of the "normal" visual sense can in no way take place in any case.

The use of a camera mounted in a glasses-like construction is described in DE 10 200 5 000 820 A1. However, this mobile arrangement expressly relates to the improvement of vision in a person who is only visually impaired and also uses purely optical methods for image output. There are no tactile devices which are indispensable in the case of an auxiliary means for completely flashed people.

BRIEF SUMMARY OF THE INVENTION

The object of the invention is to provide such an electromagnetic actuator for tactile applications with respect to the known tactile displays with linear magnetic actuators, in particular for tactile pins in braille-script displays and graphical surface displays, by means of which a mechanically-structurally simple and inexpensive bistable electromagnetic linear drive unit can be realized. Furthermore, a display with a minimum overall height is to be realized with the actuators. Furthermore, the penetration of dirt particles into the interior of the actuator should to be minimized. Furthermore, a simple and cost-effective arrangement for the electrical wiring of electromagnetic actuator coils is to be provided, which arrangement makes it possible, the tactile display can also be used as an input unit exclusively by means of the already existing actuator coils for outputting data, without the need for additional input switches or further input sensors to be installed. Finally, a device is to be made available to the blind, which offers him as perfect substitution as possible and offers a simulation of the "normal" human facial on a tactile plane.

This object is achieved according to the invention by a tactile display characterized in that the rod of the actuator consists of a material with a very high coercive field strength in such a way that the latter is axially of the same length, magnetic sleeve with a significantly lower coercive field strength and is freely movable in the axial direction, and in that the adjustment path of the rod is fixed by its over-length in comparison to the length of the hard magnetic sleeve, in such a way that an auxiliary pole is formed at one end of the rod and a plate-like main pole is formed at the opposite end.

In the actuator according to the invention, the hard magnetic polarized rod, which is designed as a specially shaped plate, is arranged in the interior of the likewise hard magnetic sleeve in such a way that it can move, in such a way that the plate itself is always positioned outside the sleeve. The coercive field strength of the material of the sleeve surrounding the rod is significantly lower than that of the movable rod. It is thus ensured that although the sleeve can be reversed in a targeted manner by the energized coil surrounding both hard magnets (rod and sleeve), the polarization of the movable rod is, however, not changed. The maximum current for the coil must be provided only for the short moment of the actual magnetization (<1 µs) of the sheath material. The end position "above" provides the maximum holding force and is defined by the magnetic attraction between the specially shaped plate (="main pole", armature) and the suitably dimensioned end face of the surrounding sleeve. This end face is dimensioned in such a way that it provides the required holding force in conjunction with the specially shaped main pole, however, the latter is precisely designed in such a way that it is reversed in the switching-over (sleeve and coil current, reverse polarity) can be overcome and the armature can thus move to the other end position. The geometric position of the end position "bottom" is clearly defined by the total length of the rod and thus the distance of the "auxiliary pole" from the armature.

In a further development of the invention, the main pole has the contour of a cone or of a cone stump or of a truncated cone with a disc-shaped base surface as a plate-like widening, the height of the cone or of the cone stump or the height of the plate-like extension of the rod, in such a way that the stray field of the plate-like main pole is no longer in the "down" position of the actuator, the magnetization of the sleeve, wherein one end of the hard magnetic sleeve has a collar-shaped extension, the diameter of which is dimensioned in such a way that the collar-shaped widening at least partially surrounds the adjoining end face of the surrounding coil, a maximum of 95% of the diameter of the plate-like main pole of the hard magnetic bar, and wherein the ratio of said coercive field strengths of the two hard magnetic materials of bar and sleeve has at least the value 3:1, so that the axial magnetic field of the coil, which jointly surrounds the rod and sleeve, does not switch only the material of the sleeve but that of the rod in the magnetic polarity.

This development has the advantage that the spatial extent of the stray field can be influenced in a targeted manner, so that a narrow (=grid spacing of less than or equal to 2.5 mm) flat juxtaposition of the individual actuators in a braille-text display and/or graphical surface display.

In a further development of the invention, the actuators of the display are arranged in parallel and vertically staggered planes in such a way, in such a way that the lateral mutual distances of the actuators in a plane are greater than the grid dimension specified for the pin plate.

This development makes it possible, in a surprisingly simple manner, to realize a display with minimal overall height, wherein the individual axial actuators are arranged two-dimensionally offset parallel to the pin-plate plane with pins of the surface display. The working direction of the individual actuators and the plane of the pin plate are perpendicular to one another.

For the reliable operation of the movable sensing pins a mechanical dirt shield is arranged below the plane of the pin plate, whereby as a result of geometric shading, the penetration of dirt particles into the interior is minimized.

This design has the advantage that it is now possible to minimize both the size spectrum and the amount of dirt particles deposited in the environment of the actuator. Due to the fact that a device which acts geometrically as a dirt shield is installed under the guide of the individual pin in the pin plate, the actual actuator is shielded from dirt. The difficulty of production technology for ensuring high-precision mechanical fits between the pin plate and the actuator is avoided, in that the pin is coupled to the actuator via a releasable magnetic connection, which already geometrically adjusts itself during the first assembly process in the manufacture of the display. For the later service case the additional advantage is that the end user (with the aid of a very simple gripping tool or the finger nails) can remove the individual pin from the outside of the display in order subsequently to make the affected individual pin itself and its guide surfaces functional again by means of a cleaning process.

In a development of the invention, the switching matrix which is provided for controlling coils connected in rows and columns and has in each case one hard-magnetic axially movable core in the interior, so that the individual coil can act both passively as a sensor via the electromagnetic induction by mechanical displacement of the hard magnetic core and mechanically actively as an actuator by means of targeted energization of the coil.

This development has the advantage that a simple and cost-effective arrangement for the electrical wiring of electromagnetic actuator coils is provided in a simple manner and allows it to be provided in a simple and cost-effective manner, the tactile display can be used exclusively by means of the already existing actuator coils for outputting data as an input unit without additional input switches or further input sensors having to be installed.

A further development of the invention, with the use of a tactile display according to the disclosed invention for an intuitively usable optical-tactile visual aid for the substitution of human foresees, is characterized in that the primary optical image information of a camera, which is designed as a surface sensor or line sensor, after passing through software-moderate image processing for the purpose of data reduction and image recognition, is fed to a large-area tactile display as a display device, wherein the number of tactile raster points is at least 50×80=400 and that a device for digital data processing is connected between the camera and the tactile display device, wherein the image field of the camera is divided into at least two regions, which represent the primary optical image with different tactile resolution, and wherein the image refresh of the different tactile regions takes place at different time intervals (frequency) in each case.

This development has the advantage that in a simple manner the available tactile capabilities are sufficient, purely intuitive, i.e. without further cognitive control and control functions, on a large-area tactile point grid (typically at least 80×100 points), and to substitute warning possibilities of the facial sense. What is essential here is, in particular, the evolution-related architecture: awareness (with high resolution) versus unconscious but rapid peripheral vision (with low resolution) to transfer into the tactile domain. The training effort does not exceed the usual effort for accustoming to a new tactile aid.

Further advantages and details can be seen from the following description of preferred embodiments of the invention with reference to the drawing.

DETAILED DESCRIPTION OF THE INVENTION

Figure 1A:
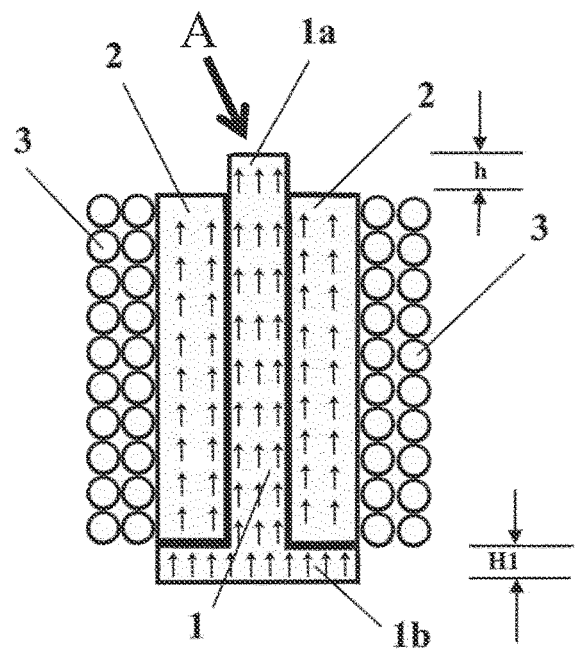
FIGS. 1a to 1d show different functional phases of a first embodiment of the magnetically bistable axially symmetrical linear actuator according to the invention.

To clarify the purely magnetic function a view of a magnetically bistable axially symmetrical linear actuator A according to the invention (as part of the display 54 according to the invention) in FIG. 1a the "top" position of the rod 1 is shown. In the case of this and the following representations (see FIG. 1b, FIG. 1c, FIG. 1d) only a rectangular cross-section of the axially symmetrical poles is used for the sake of clarity. The linear, freely movable hard magnetic bar 1 slides in the likewise hard magnetic sleeve 2.

The stable "top" position in which the coil 3 is not supplied with current is shown. The plate-shaped main pole 1b ensures the spatially clearly defined "upward" position of the rod 1 which is maintained with maximum force. The thickness of the main pole 1b is designated by "H1". The projection of the auxiliary pole 1a is designated by "h" as the difference in length of the sleeve 2. The axial magnetization directions present in both materials are indicated by arrows. The representation of the magnetization directions is to be considered as a principle sketch.

Figure 1B:
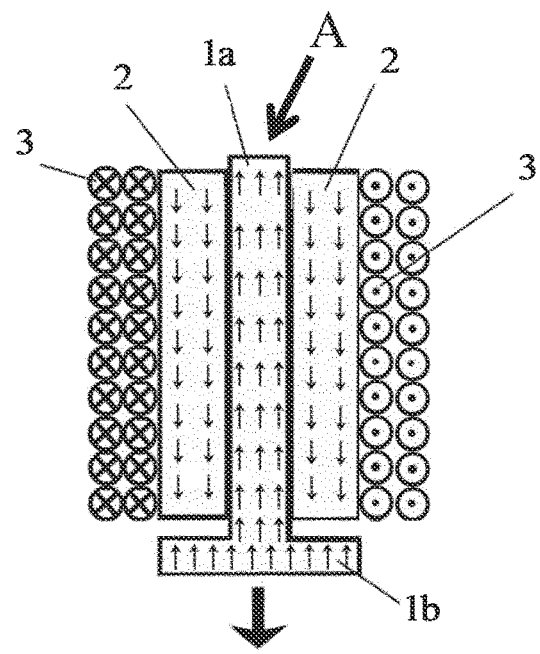

FIG. 1b shows the transition phase from the "up" to the "down" position, in which the sleeve 2 is already reversed by the magnetic field of the now energized coil 3 (as illustrated by the points and crosses in the wire cross-sections). The thick vertical arrow indicates the downward movement; the illustrated magnetization is shown schematically as already set forth in the description of FIG. 1a.

Figure 1C:
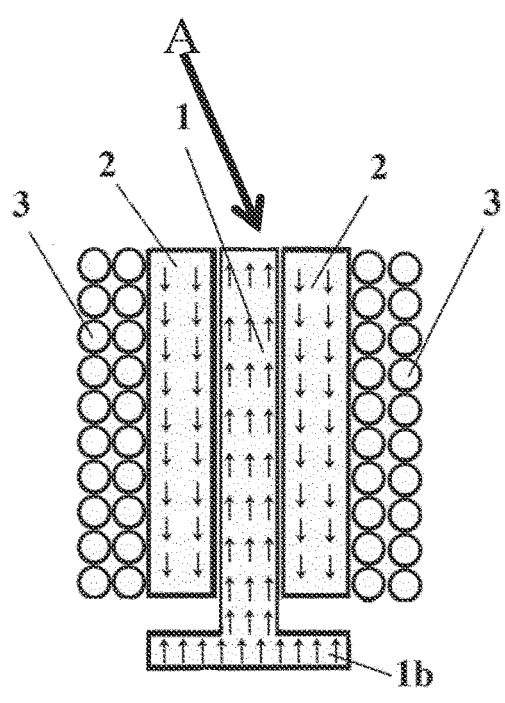

FIG. 1c shows the stable "bottom" position of the rod 1, likewise with an unenergized coil 3 and magnetization directions indicated by arrows. The upper end 1a of the rod 1 serves as an auxiliary pole which implements the "bottom" position of the entire rod 1 in terms of force and position. By means of the thickness H1 of the armature, the spatial intensity drop of the magnetic field of the main pole 1b is in principle controlled on the upper side thereof (demagnetization fields in the interior of the pole). The field strength is set up in such a way that in the "bottom" position of the rod (see FIG. 1c) no re-magnetization of the sleeve material can take place by means of the stray field of the armature 1b and the position is thus stable geometrically and in terms of force.

Figure 1D:
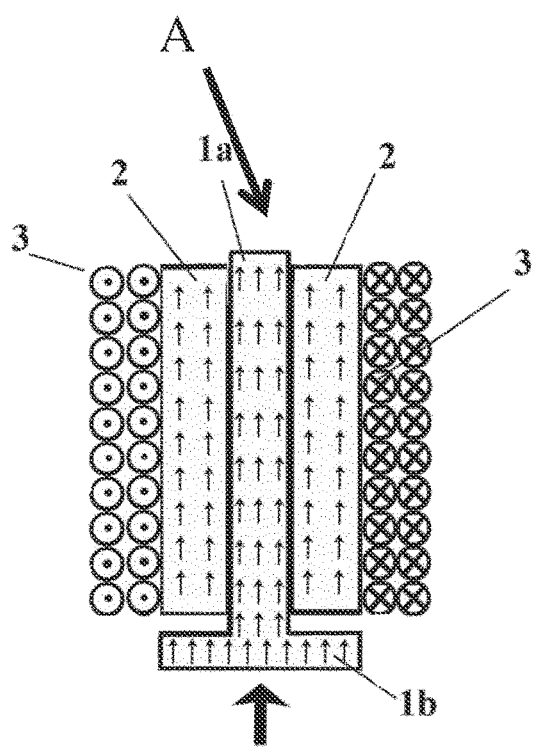

In order to realize the upward movement of the rod 1, the coil current then flows in the opposite direction, with the opposite magnetization of the sleeve 2 and in the opposite direction of force, as shown in FIG. 1d. The thickness arrow now indicates the direction of movement upwards.

In the technical realization, the transition from FIG. 1a (de-energized, stable position "top") to the situation in FIG. 1b (just re-magnetized sleeve 2 with energized coil) is especially critical, because with the demand for high "upward" holding force of the actuator A on the one hand and a with acceptable coil currents (for example below 3 A) possible separation of the plate 1b from the sleeve 2 on the other hand, two phenomena working with respect to one another are involved: large holding force requires a strong attraction between the main pole 1b and the sleeve 2, while easy detachability of the partners by moderate coil currents requires just a weaker main pole field. In addition, the actually occurring micro-magnetic polarization conditions in the sleeve 2 are quantitatively difficult to detect and cannot even be controlled in detail by the "externally" applied macroscopic coil field.

The electrical switching times of the arrangement must also be taken into account with regard to the energy requirement. The field of the plate-shaped main pole 1b, which is removed from the sleeve 2, must be so weak, in such a way that it can no longer switch over the sleeve material if the assistance of the repulsive coil magnetic field is no longer provided after the coil current has been switched off. In the active case (actuator operation), the typical rise time of the coil current is approximately 300 µs, corresponding to the inductance of the coil 3 used (typical mass: external diameter 3.2 mm, length 4 mm, approximately 250 turns) at a typical driving voltage of about 30V. For the reliable function of the actuator a dimensioned in this way, only about 3 A coil current is required for switch-on duration of approximately 1 ms.

In the passive case (operation of the arrangement as tactile input unit (see FIG. 16 display 54), the tactile pin must then be in the "up" position) the physical relationships of the electromagnetic induction apply as a function of the rate of the change in magnetic flux through the coil—caused by the movement of the main pole 1b and the auxiliary pole 1a when the coupled tactile pin is pressed down—sets an electrical potential difference over the coil ends. With the dynamics of a tactile finger pressure, induction voltages of approximately 35 mV can be achieved in this way. The temporal pulse form is relatively complex, consisting of the base profile corresponding to the purely mechanical-tactile movement rate and a higher-frequency component which is smaller in terms of level. Presumably, two parallel operations are used here: on the one hand, the magnetization of the sleeve 2 is limited by the "slow" spatial removal of the plate-shaped main pole 1b as a whole (relaxation of the involved domain magnetization into its original orientation of the light magnetic axis) in addition, the auxiliary pole 1a already starts with the re-magnetization of the first domains of the sleeve material during the simultaneous exchange into the upper part of the sleeve 2. Due to the micro-magnetic form-anisotropy of the materials used, this folding of the local domain magnetization takes place only above a certain field threshold, but then "abruptly", as a result of which the high-frequency pulse portion is explained.

When the tactile pin is released, it springs back into the originally set "top" position, as is required for the further correct display of the data (=set braille-pins) for the actuator in the output mode. The voltage peak when released tends to be approximately 20% higher, with high-frequency components occurring in an increased manner when the main pole 1b strikes the end face of the sleeve 2. When using a suitable electrical detection technique (in particular a "partial response" detection, as is customary in magnetic storage during HDD readout) the bistable actuator A according to the invention can also be used as an input unit. Thanks to the matrix control of the coils 3, even the position of the pressed pin is known. In a surprisingly simple manner, a mouse cursor can be simulated on the tactile display 54 and can be connected to the computer with a 1:1 transmission of the screen-oriented operating mode into the tactile domain of the blind PC user.

Figure 2A:
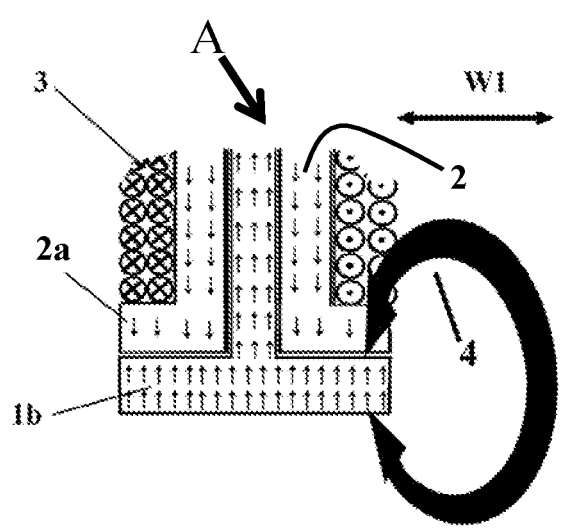
FIGS. 2a to 2e show five further embodiments of the linear actuator according to the invention.

These findings are the reasons for the novel special design of the pole shapes of the actuator a in the tactile application presented. The group of representations 2b, 2c, 2d and 2e shows the effect of this special contour of main pole/plate 1b and sleeve 2 onto the magnetic fields in comparison with a simple cylinder shape with a 1:1 fit of the diameter of plate 1b and sleeve 2 as shown in FIG. 2a. There the (strong) stray field 4 of the main pole 1b is represented merely symbolically by the strength and lateral position of the curved double arrow. It can be envisaged, for example, that this is to say approximately the spatial extent up to which the (strong) stray field 4 of the main pole 1b would still be able to magnetize the low-coercivity material of the sleeve 2 in a dominant manner despite the presence of the coil field. This spatial extension of the corresponding stray fields 4 or 4cd is indicated by W1 or w2. W1 is in this case significantly greater than w2. The physical background is only shown purely qualitatively in order to illustrate the special effects of the pole contours.

Considering only the holding force in the "top" position, the embodiment of FIG. 2a initially appears with respect to the holding force as the optimum solution for the tactile application. However, the magnetization-, force- and field ratios of the involved components sleeve 2, 1, plate 1b and energized coil 3 in the switching-over situation (see situation FIG. 1a to situation FIG. 1b for this purpose) a precisely calculated lowering of this maximum holding force is achieved by the adjustment of the diameter quotient of plate 1a and collar of the sleeve 2 which is widened at one end. It can be seen how the (strong) edge fields (stray fields) 4 of the plate 1b in the case of FIG. 2b engage in the "empty state", while in FIG. 2a the maximum attractive force between plate 1b and sleeve 2 is achieved because of these edge fields. The technical realization now shows that with acceptable coil currents (of, for example, below 3 A) no sufficient counter-force can be generated for detachment if a moderate coil current and the sheath magnetization are intended to initiate a downward movement of the rod 1.

Figure 2B:
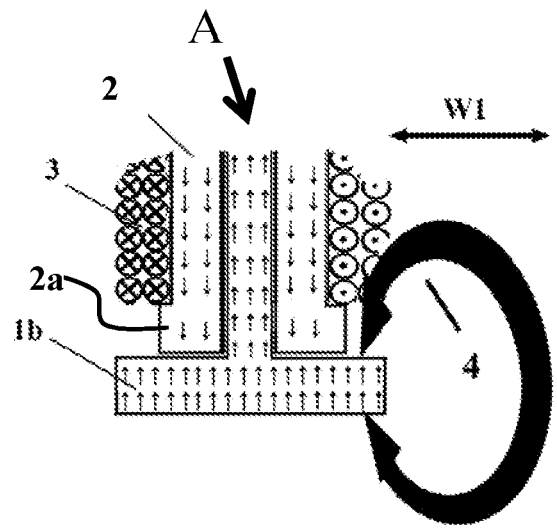
Figure 2C:
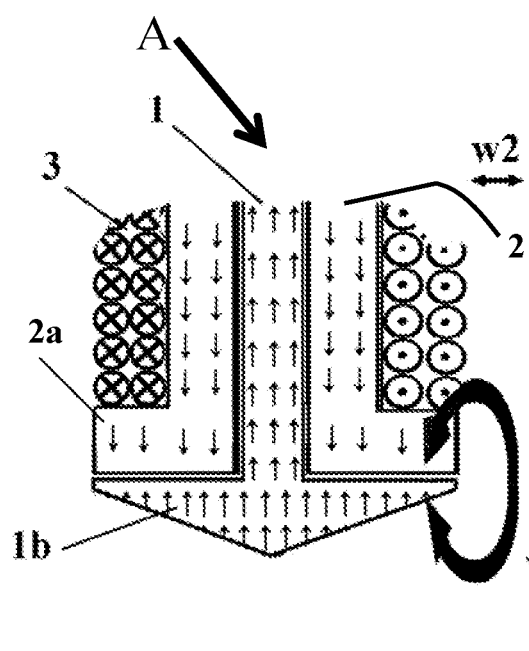
Figure 2D:
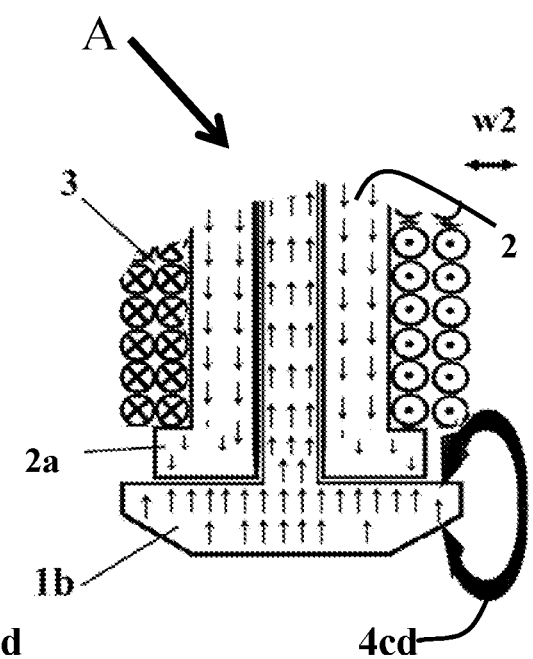
Figure 2E:
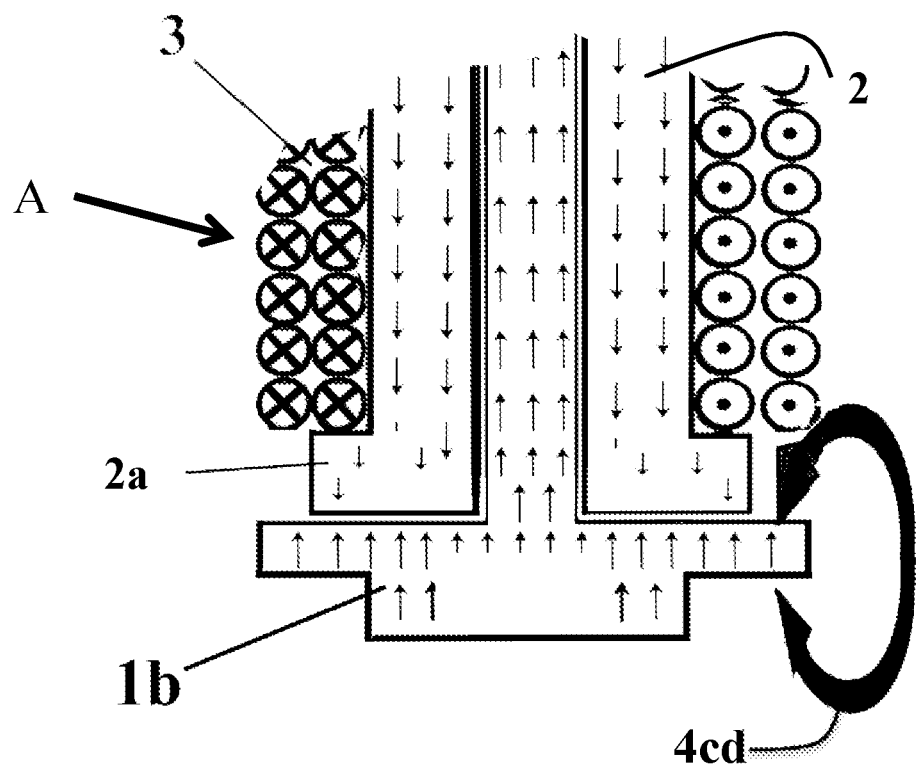

The conical special design of the plate 1b in FIG. 2c causes exactly this lowering of the maximum holding field and additionally ensures a clear, aimed reduction of the magnetic stray field 4cd to one or more other adjacent actuators, which are not shown in the illustrations for reasons of clarity. Both contour measures can be carried out in technical implementation depending on the current field conditions (caused, for example, by details of the magnetic material used and the distance ratios between the pins of adjacent actuators) together (FIG. 2d, where the plate 1b is exemplarily designed as a truncated cone, FIG. 2e shows an alternative stepped embodiment of the contour), but can also be used only individually (FIG. 2b, FIG. 2c).

Figure 3:
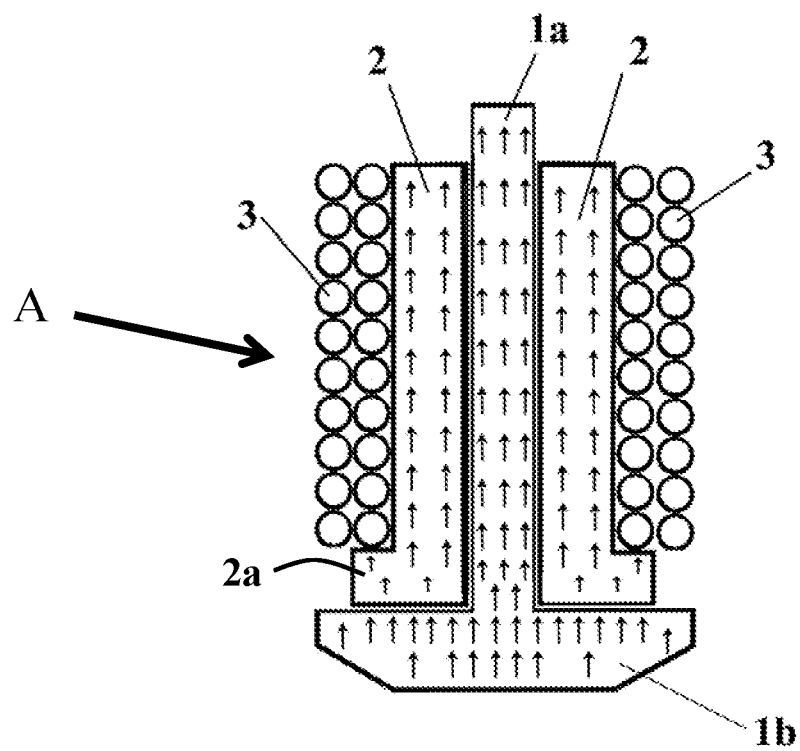
FIG. 3 shows the embodiment according to FIG. 2d in a further functional phase.

FIG. 3 shows the arrangement according to the invention at the upper stable operating point without supplying current to the coil 3. The relevant magnetizations of sleeve 2 and rod 1 are indicated schematically.

Figure 4:
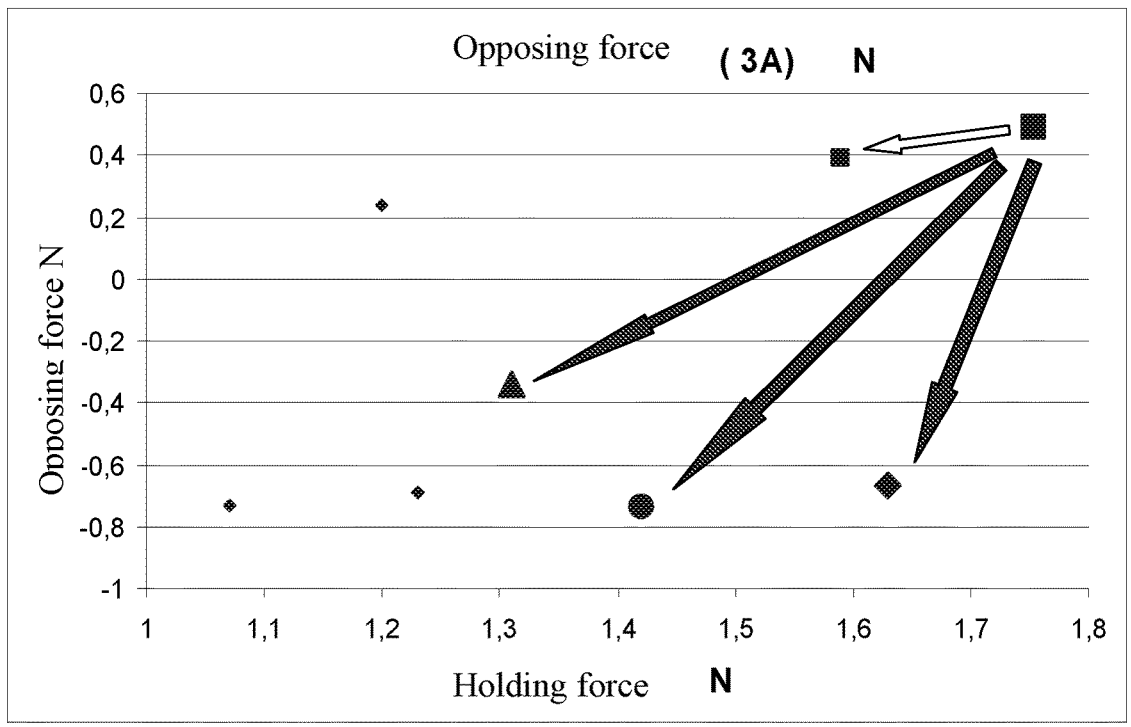
FIG. 4 shows the graph of holding force and counterforce for various geometric combinations in a configuration of the linear actuator according to the invention.

In FIG. 4, the specific effects of the described contouring measures of the poles are carried out for different geometric combinations. Coercive field strengths and saturation magnetizations of the bar and sleeve material combination (1, 2) were (9700 A/cm at 1.2 tesla) and (480 A/cm at 1.38 tesla). Applied is the "counterforce", which must be negative for the downward movement of the bar 1, above the (positive) holding force in the stable "top" position. When using a plate 1b having a diameter of 3.3 mm and a height of 1.5 mm, the best holding force of 1.75 N is obtained. However, the arrangement cannot be used, because when magnetizing (3 A current) a positive, that is to say upward directed counterforce results: the plate 1b remains suspended on the sleeve 2.

Purely scale-technical measures (diameter 3.0 mm and height 1.0 mm) does not bring the arrangement into the functional region (indicated in FIG. 4 by the open arrow pointing from the large square symbol to the smaller). Only the described contour measures for the poles bring the desired negative values for the opposing force, associated with acceptable, slight reduction of the holding force, as indicated by the thick arrows filled black. The two lower arrows show the effect of reducing the diameter of the sleeve collar (by 30% or 50%) while the upper thickness arrow (to the triangular symbol) demonstrates the effect of the cone contouring of the main pole 1b. The (further) sinking of the holding force is understandable, but the advantage of the smaller stray field in the use then predominates, as has already been described in FIG. 2c, 2d.

Figure 5:
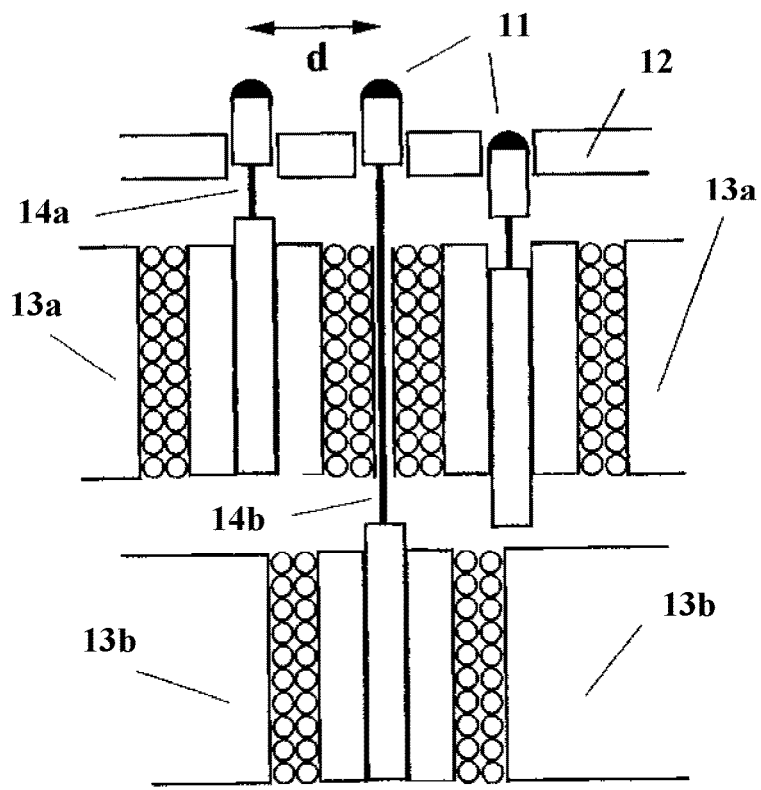
FIG. 5 shows the configuration of a display with two actuator levels according to the invention.

As in cross section easily shown in FIG. 5 for the example of two actuator planes 13a and 13b, the individual axial actuators A are arranged two-dimensionally offset parallel to the pin-plate plane 12 with pins 11 of the surface display. The working direction of the individual actuators A and the plane of the pin plate 12 are perpendicular to one another. The frictional connection of the individual actuator a to the tactile pin 11 is brought about by way of the lower part 14a and 14b of the tactile pin 11 that is tapered in diameter. If the actual tactile pin 11 and its tapered lower part 14a or 14b are designed as parts, which are separate in terms of physical and material terms, it is sufficient, to have one type of tactile pins 11 with the large nominal diameter but otherwise the same length for both actuator planes 13a and 13b. In the case of this representation of the basic principle on only 2 actuator planes 13a and 13b, the lowest plane of the control-IC has not yet been shown for the sake of clarity.

Figure 6:
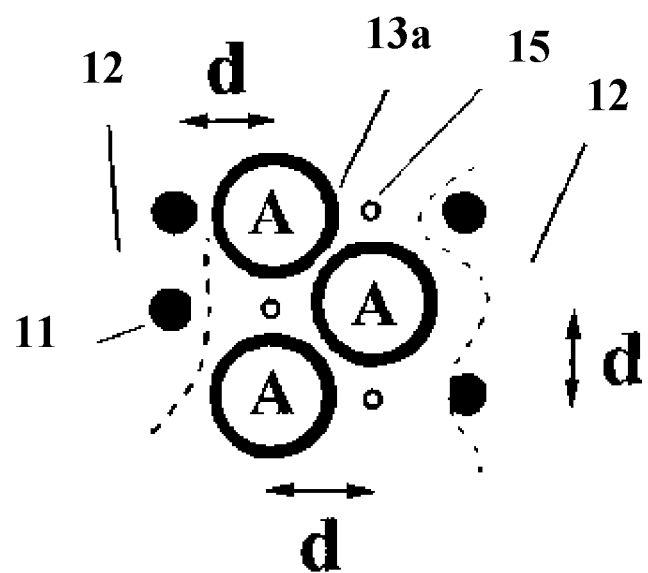
FIG. 6 shows the hole pattern of the display according to FIG. 5.

FIG. 6 shows the hole pattern of the arrangement according to FIG. 5 in plan view of the upper actuator plane 13a, the pin plate 12 lying above it being indicated by pins 11 only at the edge of the drawing. A is in each case the mounting position of the individual actuator A. The through-bores 15 for the tapered actuating part of the pins 14b of the actuator plane 13b located underneath are correspondingly attached to the required grid dimension d. It is possible to mount individual actuators with a lateral dimension greater than the predetermined grid dimension.

Figure 7:
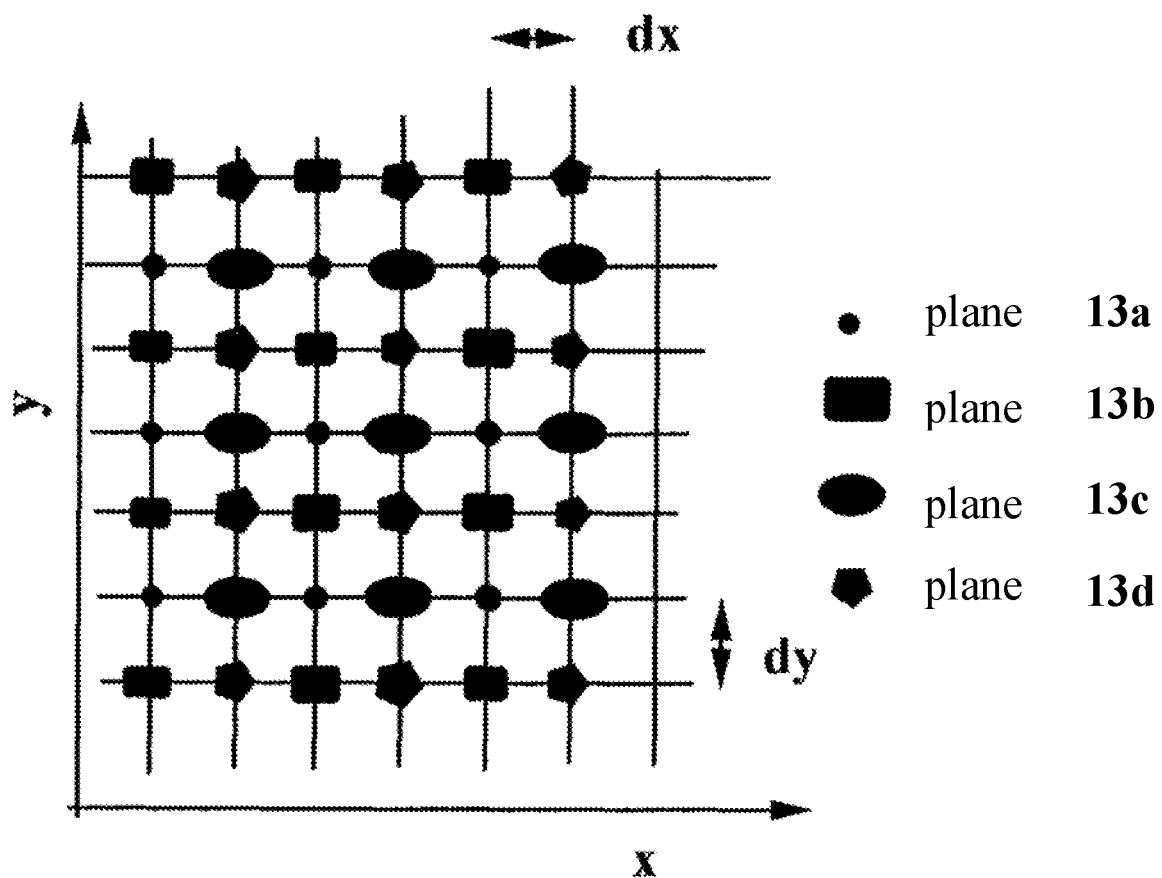
FIG. 7 shows the principle of the raster occupancy pattern for a configuration of a display with four actuator planes.

FIG. 7 shows the principle of raster occupancy pattern of four actuator planes 13a to 13d in an x-y coordinate system in plan view. The grid dimensions can in principle be different in the x and y directions, as indicated by the designation dx and dy. It can be seen that for all planes 13a to 13d identical 4-position basic patterns in each case twice the spacing of the pin-plate raster dx and dy, are laterally displaced in the x and y direction depending on the actuator plane in such a way that finally all grid points of the uppermost pin plate 12 (not shown here) can be covered. In virtually every plane are arranged in the narrow pin raster (dx and dy), as far as the lowest plane 14d, through-bores for the actuating rods 14a, 14b, 14c, 14d of the respective lower planes. These can be designed from the dimensioning of their diameter because of the tapered diameter of the actuating part of the pins in such a way that the largest possible free space is available for the actuators in the relevant plane.

Figure 8:
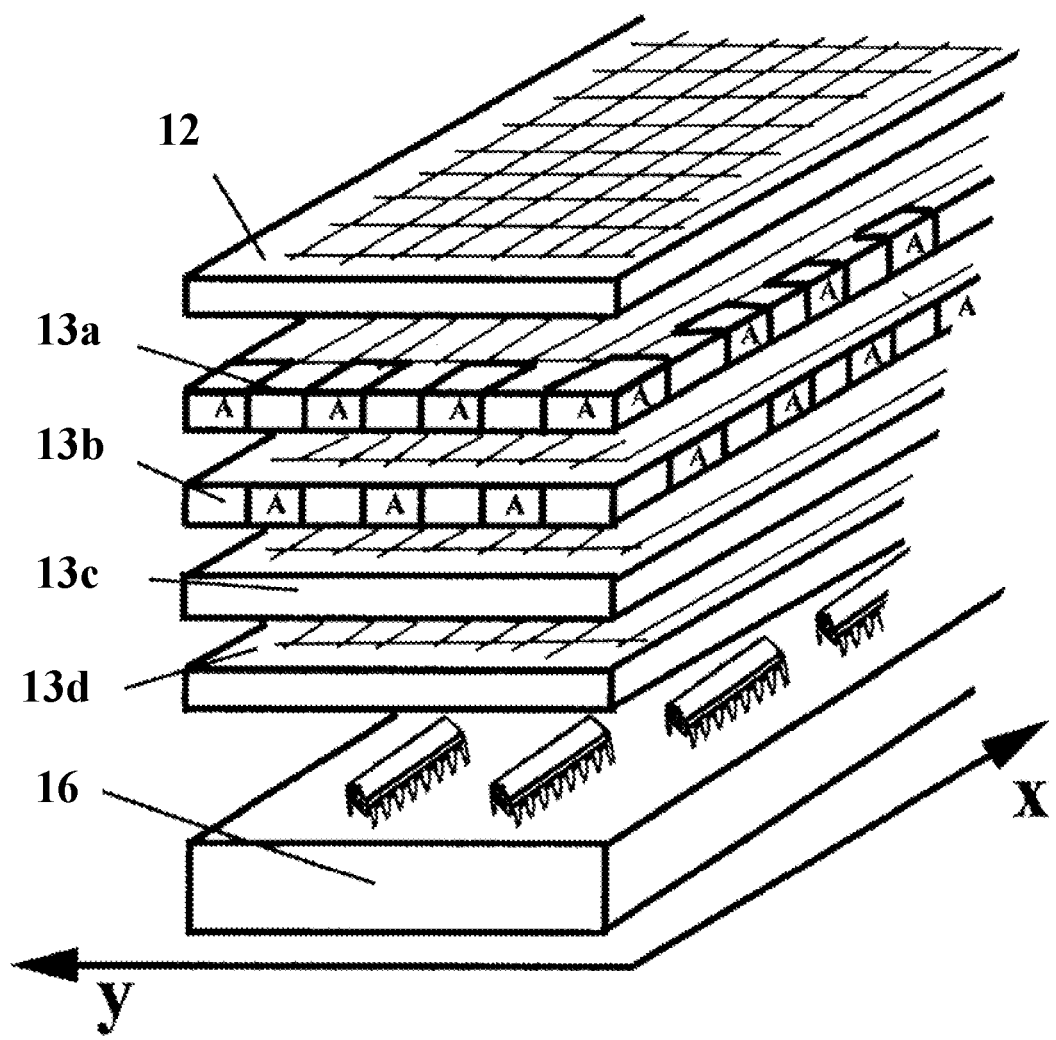
FIG. 8 is an oblique view of the entire stack arrangement for the display with four actuator planes according to FIG. 7.

The schematic oblique image sketch of the entire stack arrangement for the maximum case of 4 actuator planes is found in FIG. 8. For reasons of clarity, actuator positions are shown only for the outside actuators of the planes 13a and 13b. In the planes 13c and 13d, the corresponding positions start a grid spacing further in the interior of the respective plane. The positions corresponding to FIG. 7 are therefore occupied, for example, for the lowest plane 13d at the positions of the october symbols. The plane 16, in which the integrated circuits are mounted, closes the display downward.

Advantageously proven printed-circuit board technologies are used in the production of the actuator planes 13a to 13d, with the aid of which, in particular, the numerous openings in the actuator plates can be produced automatically in a cost-effective manner. Also the provision of necessary wiring for actuator control (completely independent of which actuator type is actually used) is thus ensured by means of a last introduced manufacturing process. Finally, the space on the planes which is free of openings can be easily seen, even the electrical connections (not shown)) between the planes to the circuit plane 16 similar to the mechanical connections between pin 11 and single actuator a perpendicular to the pin plate 12.

Figure 9:
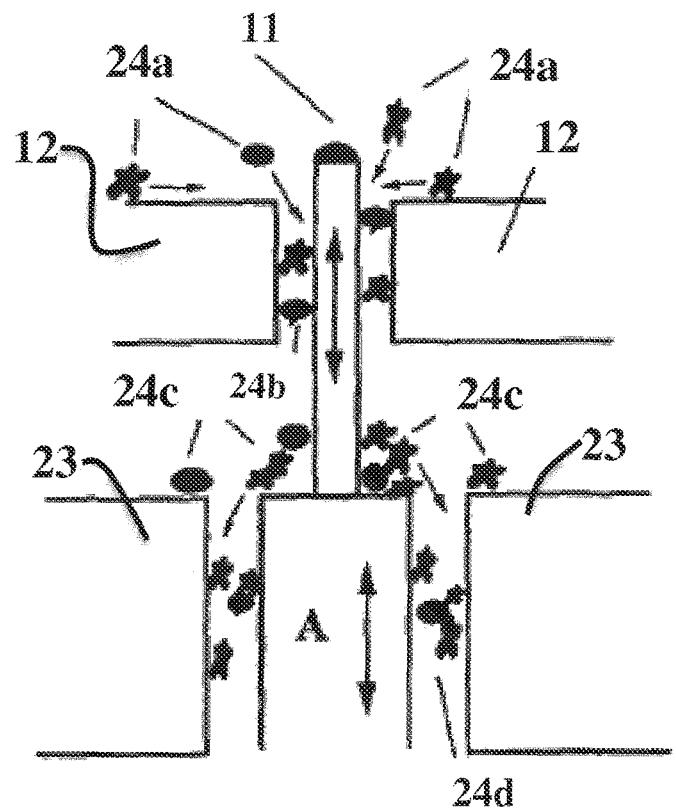
FIG. 9 shows a representation of the contamination situation in a tactile display.

FIG. 9 shows the purely geometric background of the contamination situation. The principle is sketched for reasons of clarity; thus, there is no scale fidelity. The vertically moved tactile pin 21 slides in the pin plate 12, driven by the underlying actuator A, the space-fixed structure of which is designated by 23. Whether the actuator A is the actual actuator (for example a piezoelectric element) or the functional surface of a mechanical unit (for example a toggle lever mechanism) fastened to the actuator A is irrelevant for the following consideration. The vertical linear movement of both units is symbolized by the double arrow.

The current contamination particles 24a penetrate the interior of the display 54, as indicated by the small arrows on the particles. They are fixed either directly 24b in the space between pin 21 and pin plate 12, where they immediately impede the pin movement, or reach in the course of the operating time of the display 54 even into the environment of the functional region of the actuator A, in order first to accumulate there, see 24c. From this point they can later solidly interfere with the actuator itself, see 24e.

It is now possible to minimize both the size spectrum and the amount of dirt particles 24c deposited in the environment of the actuator A. This is accomplished by mounting the dirt shield 25 shown in FIG. 10 in conjunction with the use of an actuating rod 26 for the pin 21, the diameter of which is smaller than that of the tactile pin 11. The dirt shield 25 can in this case be designed as a solid part (for example as a sheet-metal plate provided with holes) but also as a flexible film, which tightly encloses the actuating rod 26. Because of the smaller diameter of the actuating rod 26 compared to the pin 21, the foil solution itself becomes more dense, sleeve-like enclosure significantly lower inhibiting forces for the vertical movement because the frictional contact surfaces are significantly smaller than when the actual pin is closed.

Figure 11:
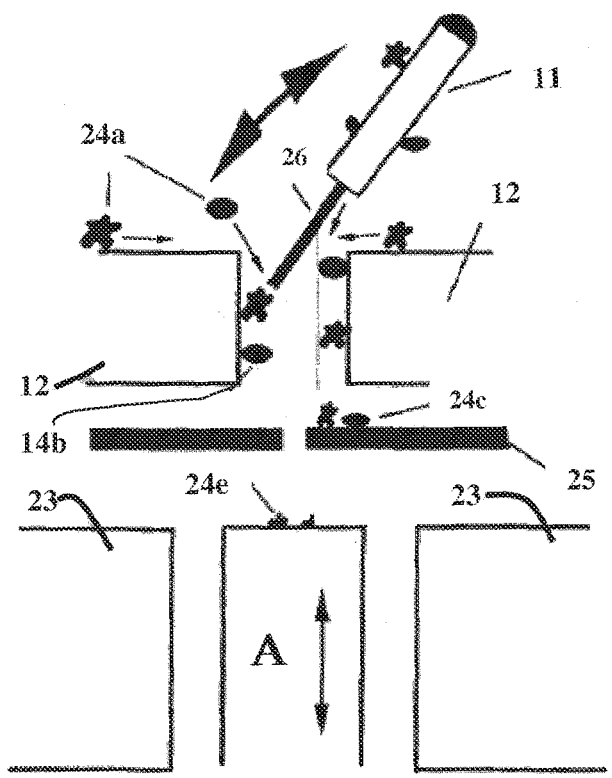
FIG. 11 shows the insertion or removal of a movable probe pin for a device/tactile display according to FIG. 10.
Figures 13A, 13B:
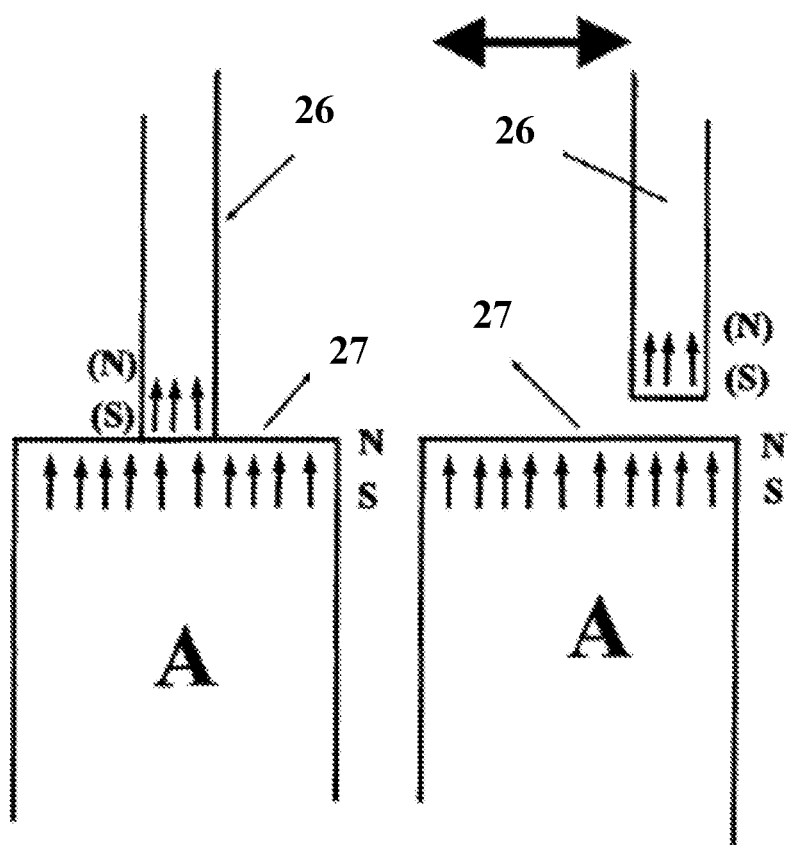
FIG. 13a, 13b is an illustration of self-adjustment for the displays of FIG. 10 through FIG. 12.

In order to remove the dirt particles accumulated over the course of the operating time, the individual tactile pin 21 can be easily removed from the outside by the user with its actuating rod 26, as shown in FIG. 11 by the curved arrow. The mechanical coupling of the actuating rod 26 to the actuator a takes place preferably by magnetic coupling of the two. The actuating rod 26 itself is soft magnetic. The actuator A itself is in the form of a complete hard magnet, as shown in FIG. 13a. The actuation rod 26 is here magnetically coupled to the end face 27 of the actuator a when viewed laterally. It is decisive for the possibility for the user to be able to easily separate the individual pin 21 from the actuator A by engagement from the outside in order to place it again without problems after cleaning.

This procedure is also possible in principle by mechanical coupling measures between actuating rod 26 and actuator A (for example click connections, rotary detents). However, the increased design effort for mechanical solutions is very critical, above all because of the manufacturing problems associated with the accuracy of pass between the pin plate 12, actuating rod 26 and actuator A. A self-adjustment of the contact position of the soft magnetic actuating pin 26 on the end face 27 of the hard magnetic actuator a, as in the case of the magnetic solution (magnetic coupling) in FIG. 13b shortly before coupling, in the case of mechanical connections it does not take place. The double arrow illustrates the lateral play in the insertion of the pin unit 11. For the sake of clarity, the tactile pin 11 fixedly connected to the actuating rod 26 is not shown here.

Figure 10:
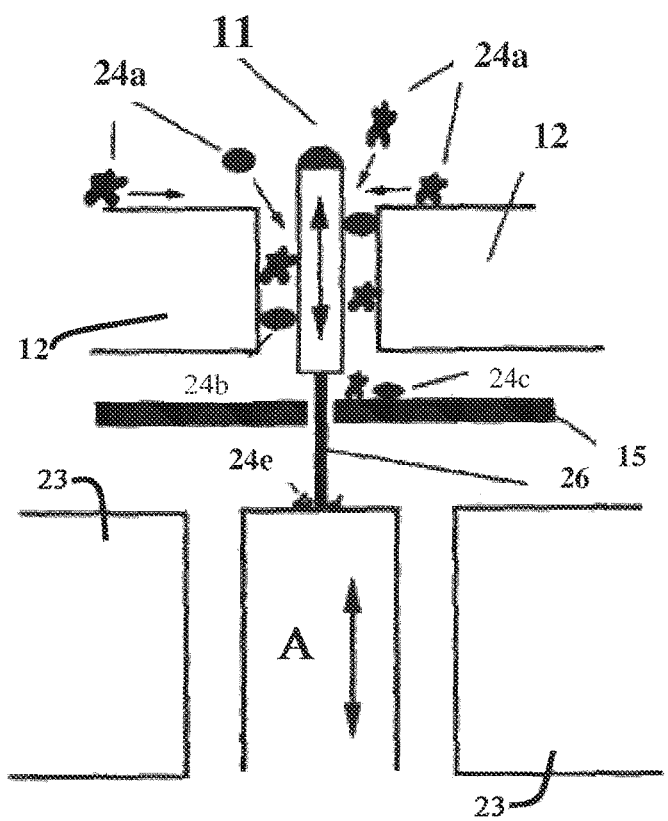
FIG. 10 shows the contamination situation in a tactile display with a dirt shield and movable feeler pins and magnetic coupling with self-adjustment according to the invention.
Figure 12:
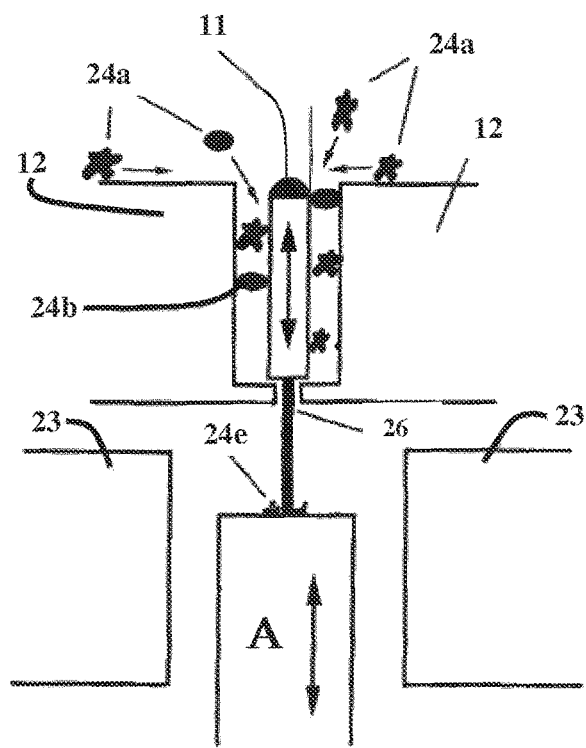
FIG. 12 shows the contamination situation for a second embodiment of a tactile display with a dirt shield and movable feeler pins and magnetic coupling with self-adjustment according to the invention.

FIG. 12 shows an embodiment of the invention in which the dirt shield 25 of FIG. 10 is integrated structurally directly into the pin plate 12 itself by a suitable geometric configuration of the openings.

Specifically the magnetic-mechanical self-adjustment of the pin unit is illustrated in FIGS. 13a and 13b. The soft magnetic material of the actuating rod 26 reacts to the presence of the spatially close hard magnet by forming induced magnetic poles, as highlighted by the designation N and S. This arrangement makes it possible to start with the geometric fit of the pin 11 in the guide of the perforated plate 12—see here, for example, FIG. 12—up to the limits of the part tolerances, so that a very narrow gap is created around the pin 21, 0 which optimally lowers the probability of penetration of dirt particles 24a into the interior of the display 54.

Figure 14:
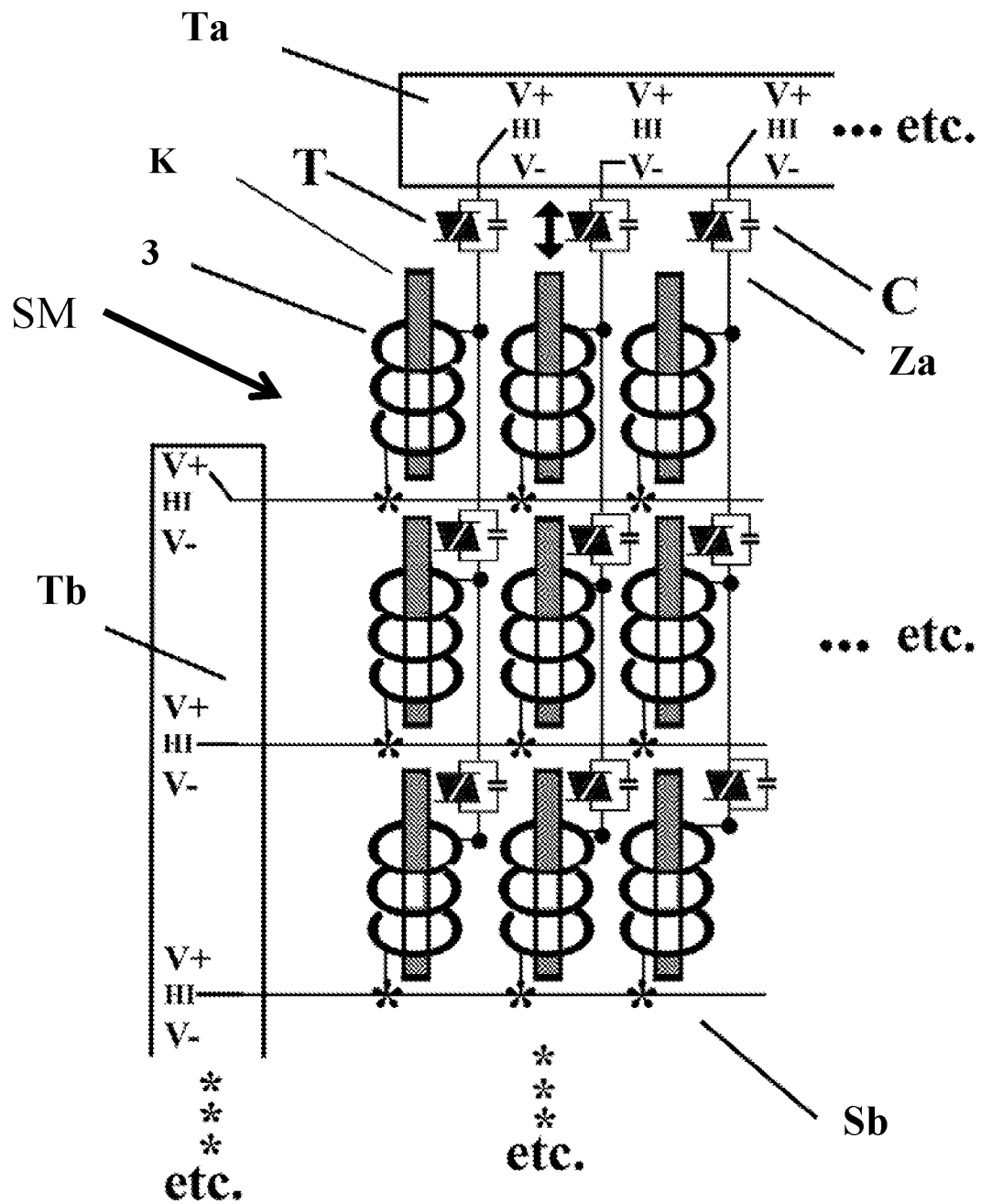
FIG. 14 shows the structure and wiring of a coil matrix for the active actuator function according to the invention.

FIG. 14 shows the basic structure and circuitry of a coil matrix for the active actuator function. The coils are designated by 3, the movable cores are designated by K. The components necessary for the correct electrical function are designated by T (for TRIAC) and C (for capacitor). For the sake of clarity, only one 3×3 arrangement is designed in detail and the detailed control of the TRIAC gate is not shown. However, the arrangement can be expanded as desired, as indicated by the dots/stars and the inscription "etc.".

The address lines for the horizontal line supply are designated by Za, those for the vertical column supply with Sb. The respective numbering index Hi or Vi is in principle unlimited. The vertical and horizontal lines carry the current for the coil energization. The driver output stages (designated by Ta and Tb) can be set to a high potential (V+), low potential (V−), or to a "high impedance" state HI. If, for example, the second coil is to be energized at the top, the address line V1 is set to (V+), at the same time the address line H2 is set to (V−). All other Vi and Hi lines indicated by "i" are in the high-resistance output state. In the example shown, only the coil with the coordinates (2, 1) is supplied with current. The actuator A reacts with the movement of its hard magnetic core K as indicated by the double arrow. All the remaining coils of the matrix "see" no potential difference at their end connections, i.e. are mechanically passive. If the coil current is to act in the opposite direction, the actuator movement is reversed and the applied voltages of the selected coil are exchanged between the respective H- and V-line.

Figure 15:
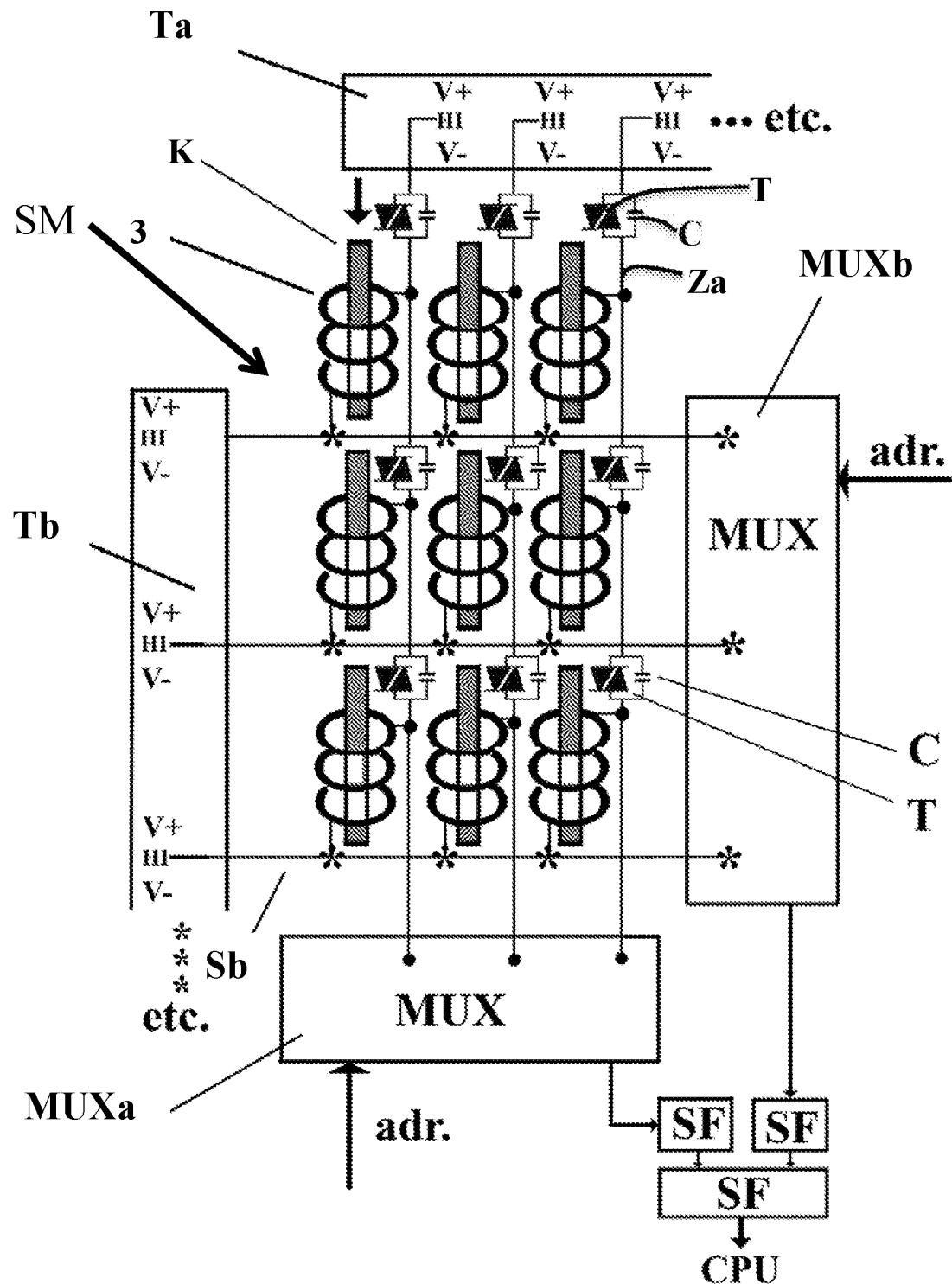
FIG. 15 shows the coil matrix according to FIG. 14 in the high-resistance input state of the device.

FIG. 15 shows the connection of the coil matrix SM in the high-resistance input state of the device. The drivers Ta, Tb of all horizontal and vertical lines Hi and Vi are in the high-resistance HI state. If the movable hard magnetic core K of a coil 3 is moved (the pressure movement of the finger is represented by the downward arrow) it generates an induction voltage in the coil. The specific Hi and Li lines (shown is now the case with the coordinates (1, 1)) then lie on an electrical potential corresponding to the magnetic flux change. Electrical circuits already known from the magnetic data storage for optimum temporal signal shaping and signal detection of inductive voltage profiles (this can, for example, be suitable diodes/capacitor combinations, peak detectors, integrators and threshold discriminators) are shown as blocks "SF". For reasons of clarity, these are not shown in detail with their special functions.

The address adr of the affected multiplexer input in the case of a specific, just manually actuated actuator core K can thus be identified and transmitted, for example, asynchronously over time to a control unit CPU via the triggering of an interrupt. However, it is also possible for the control unit CPU itself to address the multiplexers MUXa, MUXb synchronously and then to successively interrogate the multiplexer inputs at the output of the respective multiplexer MUXa, MUXb. In the concrete embodiment it may also be advantageous in terms of signaling, to perform the signal shaping SF already before the inputs of the multiplexer MUXa, MUXb, but this entails the disadvantage of a higher component insert. In practical realization it may also be advantageous to connect a plurality of actuators in parallel, or else only a certain reduced number of actuators A (for example each fourth in a row and/or column) for the passive detection function of the coil matrix SM.

Figure 16:
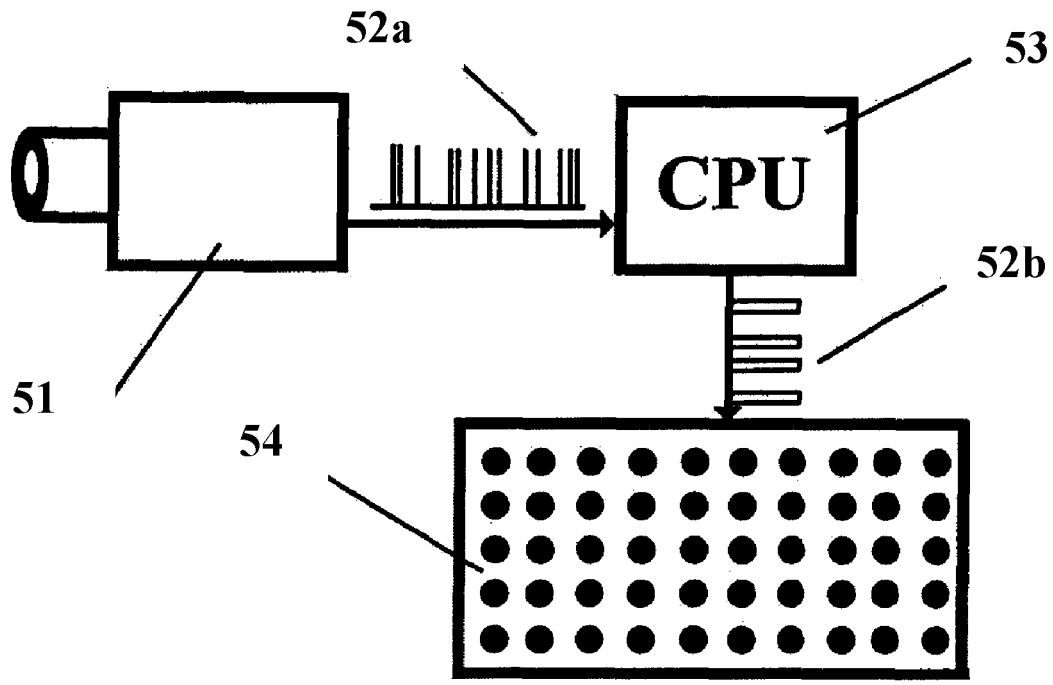
FIG. 16 shows the block arrangement of an intuitive visual aid with a flat display with a constant grid spacing of the tactile points according to the invention.

FIGS. 16 to 22 show an application of the invention as an intuitively usable optically tactile visual aid. FIG. 16 shows the block arrangement of the intuitive visual aid. In this case, a digital camera 51 can be configured as a full-area camera or line camera ("scanner"). The image signals 52a are supplied to a data processing device 53. It may be a personal computer, a digital signal processor, a CPU or a microprocessor. The software of the data processing device 53 fulfills the requirements of a data reduction with image recognition. The software divides the image into regions of different tactile dot resolution and different rapid tactile image refresh and the corresponding image signals 52b are passed on to a tactile display 54, hereinafter also called tactile device 54. The advantage of this splitting measure is that the blind can scan, for example, the outer region of a tactile image very quickly, without being deflected by means of detailed representations at another location of important information. Here, for example, a sudden vertical crossing of the path is caused by a rapidly moving person. Here, the exact contour of the person or even the information person or woman is initially completely unimportant; the fact that an obstacle suddenly appears has to be quickly felt by the fingers. The difference between image signal 52a and signal 52b with respect to pulse density and pulse number is to be understood that the signal 52b is a data-reduced signal as compared to the original image source, i.e., of the digital camera 51.

Figure 17:
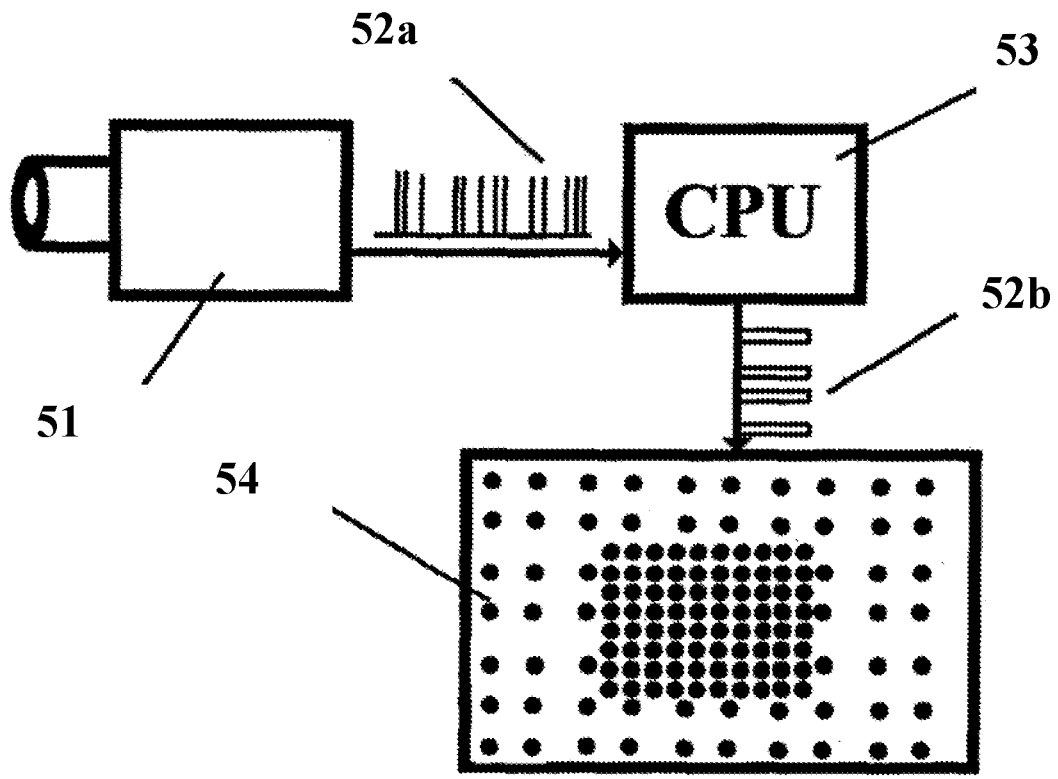
FIG. 17 shows a configuration with a flat display with geometrically non-uniform point raster.

In FIG. 16, the tactile device (display 54) is shown as a flat display with a constant grid spacing of the tactile points. On the other hand, FIG. 17 shows an embodiment of the tactile display 54 with a geometrically non-uniform dot raster. Preferably the arrangement of the differently resolving raster areas is centrally symmetrical to the center of the image in order to simulate approximately the function of the "foveal vision" of the human face.

Figure 18:
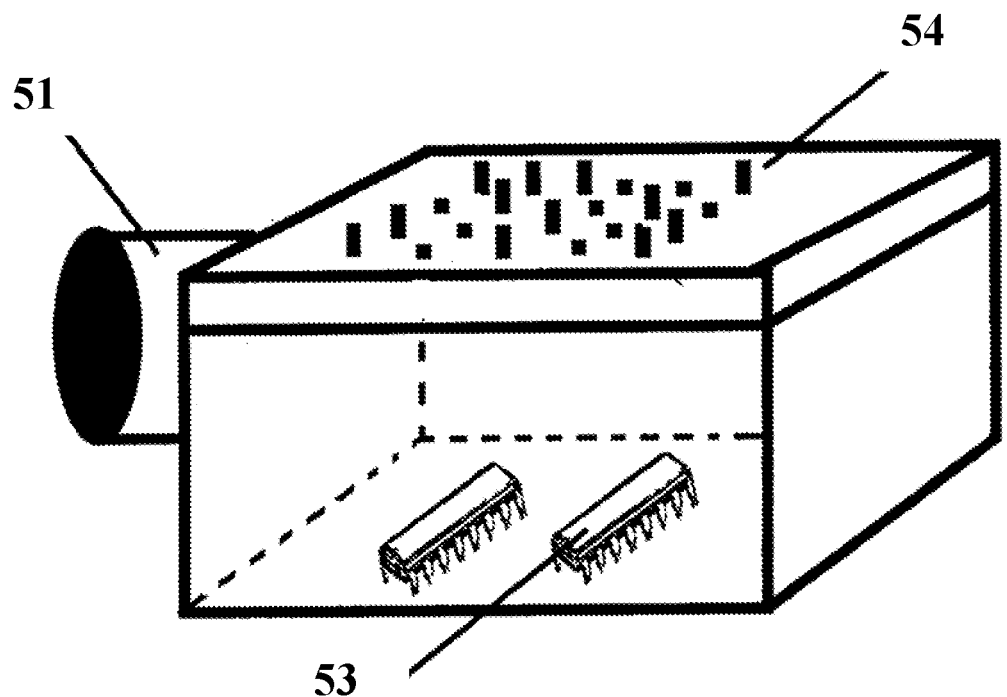
FIG. 18 shows an embodiment with an arrangement of camera data processing and tactile display in housing.

FIG. 18 shows a possible embodiment in which camera 51, data processing 53 and tactile device/display 54 are arranged in housing. The different heights of the individual tactile positions of the display 54 show in each case one set/unset state in each case. The housing can in principle be used both in a mobile and stationary manner. The stationary version with a camera 51 with a surface sensor is conceivable, for example, for installation in the desk of a blind spot processor, which often has to communicate with persons sitting or standing opposite it.

Figure 19:
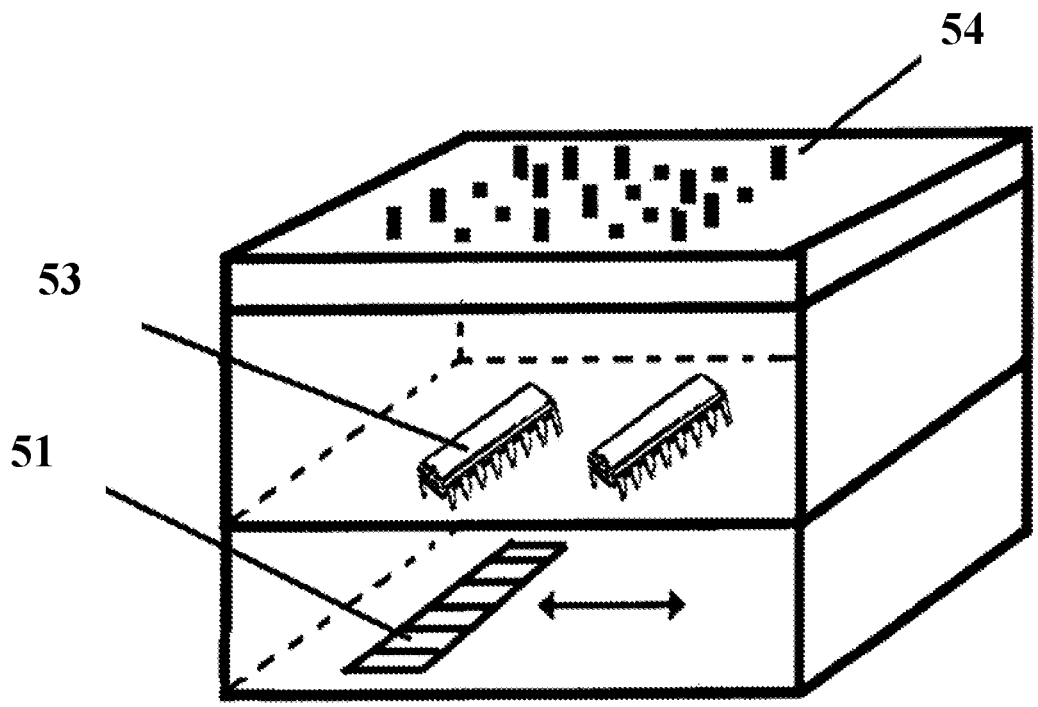
FIG. 19 shows an embodiment with a built-in line camera/scanner.

FIG. 19 shows a possible variant with a built-in line camera/scanner 51 for optically tactile scanning of flat graphic originals. The double arrow symbolizes the mechanical path of travel of the line camera/scanner 51. For reasons of clarity lighting devices, mechanical guides and electrical connections between the individual components are not shown. This line scan variant can, of course, also be implemented as a mobile device.

Figure 20:
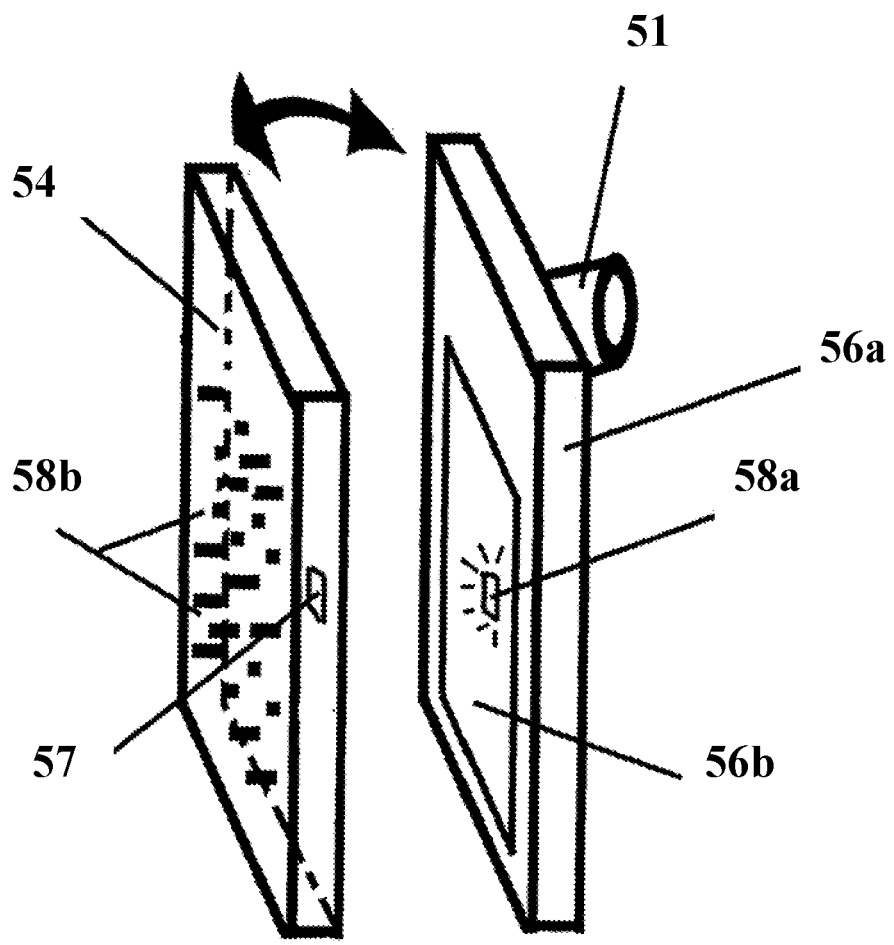
FIG. 20 shows an embodiment as a mobile variant, in particular a smartphone.

FIG. 20 shows a special mobile variant which uses hardware and software of an intelligent mobile telephone, "smartphone" 56a with screen 56b and built-in camera 51 already present in the user, for example. Here, the tactile display 54 is placed only on the existing screen 56b of the smartphone 56a, as indicated by the curved double arrow. This variant can be designed in such a way that the tactile display 54 can also be placed or removed again at any time by the user. The use of a smartphone 56a is particularly advantageous because of suitable software programs ("apps") both the existing hardware (central processor) for data processing as well as the optical screen of the smartphone can be used directly as an optical output device for the image patterns 58b to be displayed in the tactile display 54. In the embodiment shown in FIG. 20, the tactile display 54 is controlled virtually in a "contact method" without further wiring expenditure, which occurs via optoelectronic components 57 in the tactile device that scan the optical screen pattern 58a.

For the sake of clarity, only the optical receiver 57 for a single active transmitting picture element of the smartphone display 56b is shown. The optoelectronic connection is, of course, not mandatory. Also for the signal exchange can be used—if appropriate also of supply voltages—the connecting plug already present in the smartphone used for data exchange/power supply.

Figure 21:
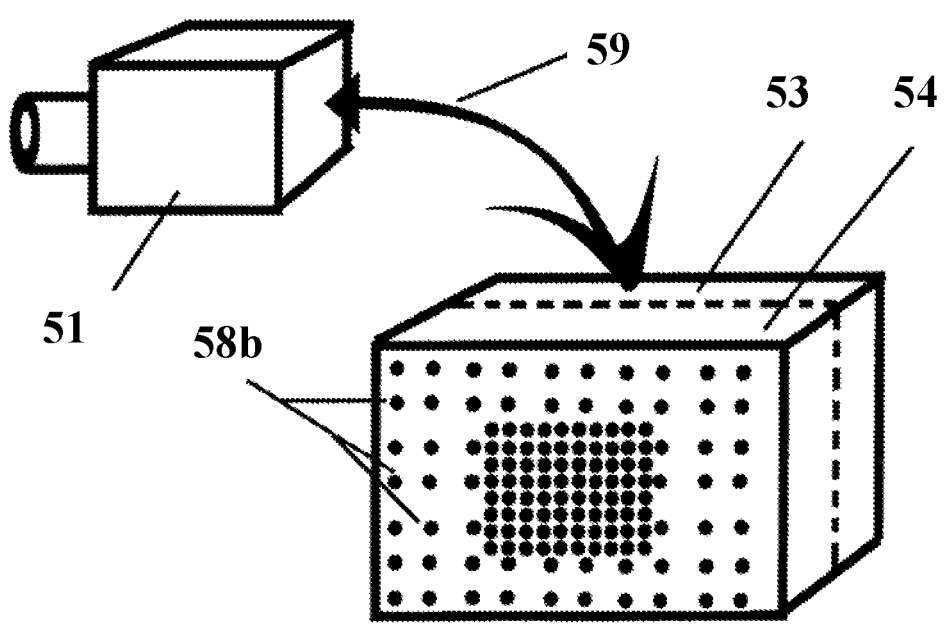
FIG. 21 is a side view of the embodiment of FIG. 20.

FIG. 21 shows the side view of the assembled arrangement corresponding to FIG. 20. It being clear how flat and compact the optically tactile visual aid can be designed in this mobile embodiment. The set/unset tactile pins for the image pattern 58b to be displayed are shown only schematically with respect to their height to illustrate their display function. In the practical embodiment, the non-set pins will not project beyond the left surface of the display 54, for example.

Figure 22:
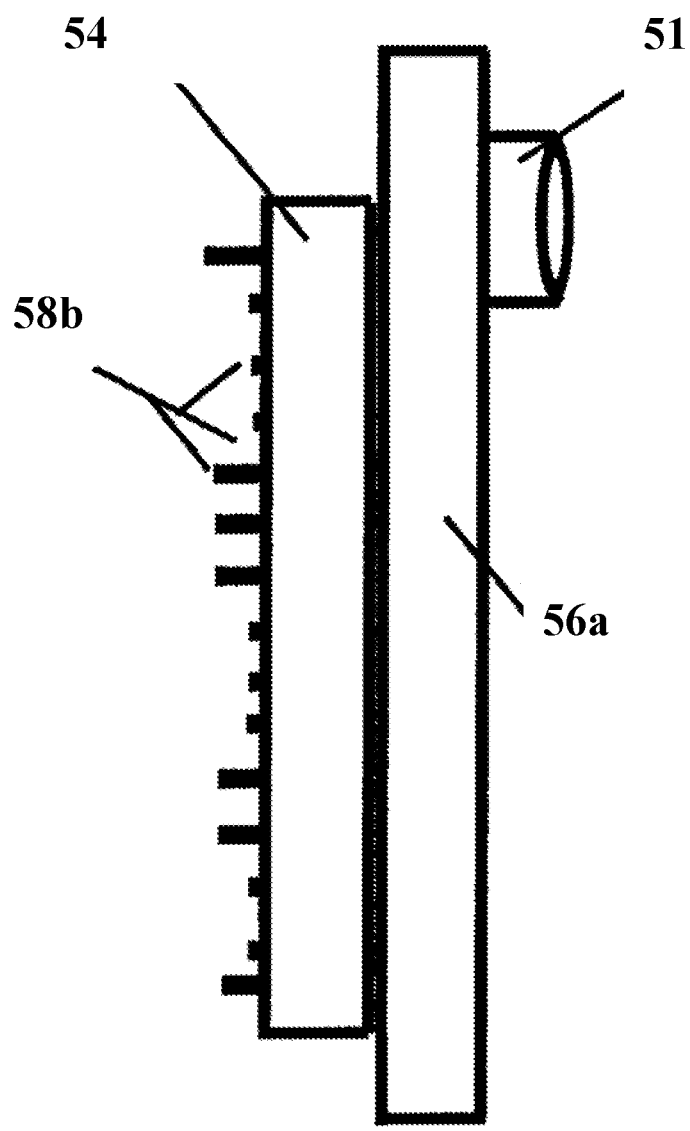
FIG. 22 shows another embodiment of the mobile variant.

Of course, instead of an existing smartphone with camera 56a, 56b, 51, it is also possible to use a special camera, preferably with extreme wide-angle optics. Accordingly, the telephone 56a and its screen 56b can then be replaced appropriately by a housing with built-in data processing unit 53 and power supply. This is shown in FIG. 22.

The camera 51 is shown next to the tactile display (output unit) 54 with the data processing device 53. The camera 51 integrated into the housing of the display 54 can be fastened, for example, to the clothing approximately at the height of the shirt collar, or also in a spectacles-like fastening manner on the head. The tactile display 54 may be carried for convenient use, e.g., by means of a belt on the thigh, or may be discretely carried in a hoist- or a jig-pocket.

In the illustrated embodiment, the housing of the tactile display 54 then also accommodates all further devices for data processing 53. The recorded connecting line 59 between the camera 51 and the parts 53 and 54 carried, for example, in the trouser pocket can in principle be designed as a cable connection, however, for convenient use of the device, a wireless data connection is preferred. Depending on the aspects with regard to data and hearing protection of the entire device and the voltage supply of the camera 51, one of the two alternative solutions can be realized.

The invention is also not limited to the feature combinations defined in the independent claim, but can also be defined by any other combination of certain features of all the individual features disclosed altogether. This means that each individual feature in the independent claim can be replaced by at least one individual feature disclosed elsewhere in the application or can be combined with the same with the other individual features.

LIST OF REFERENCE CHARACTERS 1 bar (linearly freely movable, hard magnetic)
1a auxiliary pole (upper end of rod 1)
1b main pole (plate-shaped)
2 sleeve (magnetically hard)
2a Collar-shaped extension (of the sleeve 2)
3 coil
4 Stray field (of main pole 1b)
4cd stray field (the main pole 1b, weaker)
11 pin
12 pin plate
13a actuator plane
13b actuator plane
13c actuator plane
13d actuator plane
14a Tapered lower part (tactile pin 11)
14b Tapered lower part (tactile pin 11)
14c Tapered lower part (tactile pin 11)
14d Tapered lower part (tactile pin 11)
15 through-bores (for tapered actuating member 14b)
16 circuit plane 23 Construction (of actuator A)
24a dirt particles
24b dirt particles
24c dirt particles
24e dirt particles
25 dirt shield
26 Actuating rod
27 end face
51 digital camera
52a image signals (digital camera 51)
52b image signals (digital camera 51)
53 data processing device (CPU, signal processor and the like)
54 tactile display (input, output unit)
56a smart phone
56b screen (of smartphone 56a)
57 optoelectronic component (optical receiver)
58a screen pattern
58b screen pattern
59 Connecting line
A magnetically bistable axially symmetrical actuator (mounting position)
adr address line (multiplexer input)
C capacitor
CPU control unit
d grid dimension
h overhang (of the auxiliary pole 1a)
H1 thickness (of main pole 1b)
Hi horizontal line (current for the coil energization)
HI high resistance state
K core (of the coil 3)
MUXa multiplexer
MUXb multiplexer
N north pole
S south pole
SM switching matrix
Sp address line (vertical column)
SF block (circuit for temporal signal shaping and signal recognition)
T triac
Ta driver output stage
Tb driver output stage
Vi vertical line (current for the coil energization)
W1 spatial extent (of the stray field 4)
W2 spatial extent (of the stray field 4cd)
Za address line (horizontal line)

The invention claimed is:

1. A tactile display comprising:
a pin plate; and
a switching matrix including
   a magnetically bistable axially symmetrical linear actuator for tactile applications including a hard magnetic rod, which is widened at one end; and
   a coil arranged on a printed circuit board in which the rod is freely movable in an axial direction;
wherein the rod of the actuator consists of a material having a coercive field strength,
wherein the actuator is axially surrounded by a hard magnetic sleeve having a significantly lower coercive field strength,
wherein the actuator is freely movable in the sleeve in the axial direction,
wherein an adjustment path of the rod is fixed by an excess length of the rod in comparison to that of the hard magnetic sleeve, and
wherein the widened end of the rod forms a main pole, and an opposite end of the rod forms an auxiliary pole.

2. The tactile display according to claim 1, wherein the main pole has a contour of a cone or of a truncated cone or of a truncated cone having a disc-shaped base surface at the widened end, wherein the height of the cone or of the truncated cone or the height of the widened end of the rod cause a stray field of the main pole in a "down" position of the actuator to no be able to switch over the magnetization of the sleeve, wherein one end of the hard magnetic sleeve has a collar-shaped widening with a diameter that is dimensioned such that the collar-shaped widening forms an adjoining end face of the coil at least partially and at most 95% of the diameter of the widened end of the rod, and wherein a ratio of said coercive field strengths of the two hard magnetic materials of rod and the sleeve reaches at least 3:1 such that an axial magnetic field of the coil, which jointly surrounds the rod and the sleeve switches only the magnetic polarity of the material of the sleeve but does not switch over the magnetic polarity of the material of the rod.

3. The tactile display as claimed in claim 1, wherein at least two and a maximum of four actuators are arranged relative to the pin plate of the display, and wherein said actuators are arranged in such a way that the lateral mutual distances of the actuators in a plane are greater than a grid dimension.

4. The tactile display as claimed in claim 1, wherein the tactile pin has a maximum nominal diameter only in a region of guide surfaces of the pin plate, wherein the tactile pin tapers in diameter below the pin plate, and wherein actuator planes are provided with narrow passage bores precisely in the grid dimension of the pin plate.

5. The tactile display as claimed in claim 1, wherein the tactile display includes at least two tactile pins with an identical and nominal diameter, and wherein the tactile display includes at most four types of actuating rods, which are tapered in comparison to the nominal diameter, and have two to a maximum of 4 different lengths.

6. The tactile display as claimed in claim 4, wherein the actuator planes are electrical printed circuit boards or a multi-layer printed circuit board, and wherein one or more additional printed circuit boards with electrical components are mounted as a lower end of the display.

7. The tactile display as claimed in claim 1, wherein for reliable operation of the movable pins a mechanical dirt shield is arranged below a plane of the pin plate, which minimizes the penetration of dirt particles into an interior.

8. The tactile display as claimed in claim 1, wherein the tactile pin is fixedly connected at one end to an actuating rod, wherein a diameter of the actuating rod is at most half the diameter of the tactile pin, and wherein the actuating rod is made of soft magnetic material and by means of magnetic forces with an end face of the hard magnetic actuator a self-adjustment of a contact position of the soft magnetic actuating rod on the end face of the hard magnetic actuator occurs before coupling.

9. The tactile display as claimed in claim 3, wherein the coils which are connected in rows and columns are controlled, having in each case one hard-magnetic axially movable core so that an individual coil can be moved both passively as a sensor via electromagnetic induction by mechanical displacement of the hard magnetic core, as well as mechanically active as an actuator by means of targeted energization of the coil.

10. The tactile display as claimed in claim 9, wherein energization of the coils in rows and columns is effected by electrically bipolar power output stages, which additionally have a third, high-resistance switching state, and wherein, in the high-resistance switching state of the switching matrix, the tactile display additionally comprises one or more analog multiplex switches with column and row lines of the switching matrix that are electrically connected to provide a difference voltage between selected column and row lines at an analog output of the multiplex switch.

11. The tactile display as claimed in claim 10, wherein supply lines to an input of the analog multiplex switch are each provided with a signal shaping, which condition an induced voltage signal for further digital processing and use, and the output of the analog multiplex switch is connected to a signal shaping, which conditions the induced voltage signal for further digital processing and use.

12. The tactile display as claimed in claim 11, wherein the signal-shaped output signal of the multiplexer in is connected to a downstream control unit (CPU), wherein the control unit is connected to a control unit asynchronous interrupt, and wherein the row and column addresses of the analog multiplex switch present at the time of the asynchronous interrupt are transferred to the control unit.

13. The tactile display as claimed in claim 12, wherein at the control unit the row and column addresses of the analog multiplex switch are generated synchronously.

* * * * *